United States Patent
Adams et al.

(10) Patent No.: US 7,694,127 B2
(45) Date of Patent: Apr. 6, 2010

(54) COMMUNICATION SYSTEMS FOR TRAVERSING FIREWALLS AND NETWORK ADDRESS TRANSLATION (NAT) INSTALLATIONS

(75) Inventors: Greg Adams, Finchampstead (GB); Peter Cordell, Kesgrave (GB); Steven Gareth Davies, Caversham (GB); Steven Gray, Reading (GB); Steven Reed, Goring on Thames (GB); Barry Scott, Tilehurst (GB)

(73) Assignee: Tandberg Telecom AS, Lysaker (NO)

( * ) Notice: Subject to any disclaimer, the term of this patent is extended or adjusted under 35 U.S.C. 154(b) by 1429 days.

(21) Appl. No.: 11/008,150

(22) Filed: Dec. 10, 2004
(Under 37 CFR 1.47)

(65) Prior Publication Data
US 2005/0210292 A1  Sep. 22, 2005

Related U.S. Application Data

(60) Provisional application No. 60/628,548, filed on Nov. 18, 2004, provisional application No. 60/533,216, filed on Dec. 31, 2003, provisional application No. 60/528,475, filed on Dec. 11, 2003.

(51) Int. Cl.
*H04L 29/06* (2006.01)
(52) U.S. Cl. ............................. 713/151; 713/182; 726/5
(58) Field of Classification Search .................. 726/5; 713/151, 182
See application file for complete search history.

(56) References Cited

U.S. PATENT DOCUMENTS

| | | | | |
|---|---|---|---|---|
| 6,360,265 B1 * | 3/2002 | Falck et al. | ................. | 709/227 |
| 6,404,746 B1 * | 6/2002 | Cave et al. | .................. | 370/262 |
| 6,470,020 B1 * | 10/2002 | Barker et al. | ................ | 370/401 |
| 6,584,110 B1 * | 6/2003 | Mizuta et al. | ................ | 370/401 |
| 6,633,985 B2 * | 10/2003 | Drell | ........................... | 726/11 |
| 6,721,284 B1 * | 4/2004 | Mottishaw et al. | .......... | 370/255 |
| 6,728,236 B2 * | 4/2004 | Potter et al. | .................. | 370/352 |
| 6,925,076 B1 * | 8/2005 | Dalgic et al. | ................. | 370/356 |
| 6,931,448 B2 * | 8/2005 | Holler et al. | ................. | 709/227 |
| 6,980,526 B2 * | 12/2005 | Jang et al. | .................... | 370/260 |
| 6,996,094 B2 * | 2/2006 | Cave et al. | .................. | 370/356 |
| 7,016,341 B2 * | 3/2006 | Potter et al. | .................. | 370/352 |
| 7,035,252 B2 * | 4/2006 | Cave et al. | .................. | 370/356 |
| 7,076,393 B2 * | 7/2006 | Ormazabal et al. | .......... | 702/122 |
| 7,099,301 B1 * | 8/2006 | Sheu | ........................... | 370/352 |

(Continued)

FOREIGN PATENT DOCUMENTS

WO   WO 02/03217   1/2002

(Continued)

OTHER PUBLICATIONS

Rosenberg, J. et al., "SIP Traversal Through Residential and Enterprise NATS and Firewalls", Internet Engineering Task Force, Internet Draft, Mar. 2, 2001, pp. 1-21.

(Continued)

*Primary Examiner*—David Garcia Cervetti
(74) *Attorney, Agent, or Firm*—Oblon, Spivak, McClelland, Maier & Neustadt, L.L.P.

(57) ABSTRACT

Methods, systems, and mediums for enabling clients to traverse firewall and Network Address Translation (NAT) installations by using probe packets between servers and clients to communication the addresses modified by the NAT.

77 Claims, 19 Drawing Sheets

U.S. PATENT DOCUMENTS

| | | | |
|---|---|---|---|
| 7,167,486 B2* | 1/2007 | Cornelius et al. | 370/467 |
| 7,272,650 B2* | 9/2007 | Elgebaly et al. | 709/227 |
| 7,274,684 B2* | 9/2007 | Young et al. | 370/352 |
| 7,340,771 B2* | 3/2008 | Chan et al. | 726/12 |
| 2001/0005372 A1* | 6/2001 | Cave et al. | 370/401 |
| 2001/0005382 A1* | 6/2001 | Cave et al. | 370/466 |
| 2001/0026554 A1* | 10/2001 | Holler et al. | 370/401 |
| 2001/0032270 A1* | 10/2001 | Koo | 709/237 |
| 2001/0043571 A1* | 11/2001 | Jang et al. | 370/260 |
| 2001/0043608 A1* | 11/2001 | Potter et al. | 370/401 |
| 2002/0042832 A1* | 4/2002 | Fallentine et al. | 709/230 |
| 2002/0152325 A1* | 10/2002 | Elgebaly et al. | 709/246 |
| 2003/0012150 A1* | 1/2003 | Chapuran et al. | 370/271 |
| 2003/0048780 A1* | 3/2003 | Phomsopha | 370/389 |
| 2003/0093563 A1* | 5/2003 | Young et al. | 709/245 |
| 2003/0154410 A1* | 8/2003 | Drell | 713/201 |
| 2004/0024879 A1* | 2/2004 | Dingman et al. | 709/227 |
| 2004/0028035 A1* | 2/2004 | Read | 370/352 |
| 2004/0037268 A1* | 2/2004 | Read | 370/352 |
| 2004/0064762 A1* | 4/2004 | Deshpande et al. | 714/44 |
| 2004/0190442 A1* | 9/2004 | Lee | 370/217 |
| 2004/0205245 A1* | 10/2004 | Le Pennec et al. | 709/245 |
| 2004/0228328 A1* | 11/2004 | Potter et al. | 370/352 |
| 2005/0075842 A1* | 4/2005 | Ormazabal et al. | 702/188 |
| 2005/0076235 A1* | 4/2005 | Ormazabal et al. | 713/201 |
| 2005/0076238 A1* | 4/2005 | Ormazabal et al. | 713/201 |
| 2005/0286466 A1* | 12/2005 | Tagg et al. | 370/329 |
| 2006/0023644 A1* | 2/2006 | Jang et al. | 370/261 |

FOREIGN PATENT DOCUMENTS

| | | |
|---|---|---|
| WO | WO 02/45373 | 6/2002 |

OTHER PUBLICATIONS

Rosenberg, J. et al., "NAT and Firewall Scenarios and Solutions for SIP", Internet Engineering Task Force, Internet Draft, Dec. 2002, pp. 1-60.

Davies, S. et al., "Traversal of Non-Protocol Aware Firewalls & NATS", Internet Engineering Task Force, Internet Draft, Oct. 12, 2001, pp. 1-23.

Davies, S. et al., "Traversal of Non-Protocol Aware Firewalls & NATS", Internet Engineering Task Force, Internet Draft, Mar. 18, 2001, pp. 1-30.

Rosenberg, J et al., "Interactive Connectivity Establishment (ICE): A Methodology for Network Address Translator (NAT) Traversal for the Session Initiation Protocol (SIP) Draft-Rosenberg-Sipping-Ice-01", Internet Draft, Dec. 29, 2003, pp. 1-77.

Press Release, Tandberg Acquires Ridgeway Systems & Software Ltd., May 19, 2004, http://www.tandberg.com/press_room/viewPressRelease.do?id=68.

* cited by examiner

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |      0x05     |      0x64     |      0xfd     |      0xe4     |
   +-+-+-+-+-+-+-+-+-+-+-+-+-+-+-+-+-+-+-+-+-+-+-+-+-+-+-+-+-+-+-+-+
   |      0x59     |      0xba     |      0x45     |      0x3c     |
   +-+-+-+-+-+-+-+-+-+-+-+-+-+-+-+-+-+-+-+-+-+-+-+-+-+-+-+-+-+-+-+-+
```
Figure 6

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |      0x05     |      0x64     |      0xfd     |      0xe4     |
    +-+-+-+-+-+-+-+-+-+-+-+-+-+-+-+-+-+-+-+-+-+-+-+-+-+-+-+-+-+-+-+-+
    |      0x59     |      0xba     |      0x45     |      0x3c     |
    +-+-+-+-+-+-+-+-+-+-+-+-+-+-+-+-+-+-+-+-+-+-+-+-+-+-+-+-+-+-+-+-+
```

Figure 17

COMMUNICATION SYSTEMS FOR TRAVERSING FIREWALLS AND NETWORK ADDRESS TRANSLATION (NAT) INSTALLATIONS

CROSS-REFERENCE TO RELATED APPLICATIONS

The present application incorporates by reference and claims priority to the following U.S. patent applications: U.S. Application Ser. No. 60/528,475 filed on Dec. 11, 2003; U.S. Application Ser. No. 60/533,216 filed on Dec. 31, 2003; and U.S. Application Ser. No. 60/628,548 filed on Nov. 18, 2004.

BACKGROUND OF THE INVENTION

1. Field of the Invention

The present invention relates to enabling clients to traverse firewall and NAT installations. In particular, the present invention uses probe packets between servers and clients to communication the addresses modified by the NAT.

2. Description of the Related Art

The following is a list of acronyms used in the present document.

| | |
|---|---|
| ALG | Application Level Gateway |
| ASSENT | Augmented Session Signaling Enabling NAT Traversal |
| DMZ | De-Militarized Zone |
| FW | Firewall |
| H.323 | ITU standard for packet based communications over non-QOS packet networks |
| ITU | International Telecommunications Union |
| IP | Internet Protocol |
| NAT | Network Address Translation (RFC 1631) |
| NAPT | Network Address Port Translation |
| SIP | Session Initiation Protocol (RFC3261) |
| TCP | Transmission Control Protocol (RFC793) |
| UDP | User Datagram Protocol (RFC768) |

The rapidly evolving IP (Internet Protocol) data network is creating new opportunities and challenges for multimedia and voice Communications Service Providers. Unprecedented levels of investment are being made in the data network backbone by incumbent telecommunication operators and next generation carriers and service providers. At the same time, broadband access technologies such as DSL and cable modems are bringing high speed Internet access to a wide community of users. The vision of service providers is to make use of the EP data network to deliver new voice, video and data services right to the desktop, the office and the home alongside high speed Internet access.

The H.323 standard applies to multimedia communications over Packet Based Networks that have no guaranteed quality of service. It has been designed to be independent of the underlying transport network and protocols. Today the IP data network is the default and ubiquitous packet network and the majority (if not all) of implementations of H.323 are over an IP data network. Other protocols for real-time (voice and video) communications, for example, SIP and MGCP also use the IP data network for the transport of call signaling and media. New protocols for new applications associated with the transport of real-time voice and video over IP data networks are also expected to be developed. The present invention relates to them, and other protocols that require multiple traffic flows per single session.

The importance of standards for wide spread communications is fundamental if terminals from different manufacturers are to inter-operate. In the multimedia arena, the current standard for real-time communications over packet networks (such as IP data networks) is the ITU standard H.323. H.323 is now a relatively mature standard having support from the multimedia communications industry that includes companies such as Microsoft, Cisco and Intel. For example, it is estimated that 75% of PCs have Microsoft's Netmeeting (trade mark) program installed. NetMeeting is an H.323 compliant software application used for multimedia (voice, video and data) communication. Interoperability between equipment from different manufacturers is also now being achieved. Over 120 companies world-wide attended the last interoperability event hosted by the International Multimedia Telecommunications Consortium (IMTC), an independent organization that exists to promote the interoperability of multimedia communications equipment. The event is a regular one that allows manufacturers to test and resolve interworking issues.

Hitherto, there had been a number of barriers to the mass uptake of multimedia (particularly video) communications. Ease of use, quality, cost and communications bandwidth had all hampered growth in the market. Technological advances in video encoding, the ubiquity of cheap IP access and the current investment in the data network coupled with the roll-out of DSL together with ISDN and Cable modem now alleviates most of these issues making multimedia communications readily available.

As H.323 was being defined as a standard, it was assumed that there would be H.323-H.320 gateways that exist at the edge of network domains converting H.323 to H.320 for transport over the wide area between private networks. Therefore, implementations of H.323 over IP concentrated on communications within a single network.

However, IP continues to find favour as the wide area protocol. More and more organizations continue to base their entire data networks on IP. High speed Internet access, managed Intranets, Virtual Private Networks (VPNs) all based on EP are commonplace. The IP trend is causing H.320 as a multimedia protocol to decline. The market demand is to replace H.320 completely with H.323 over IP. But perhaps the main market driver for transporting real-time communications over IP across the WAN (wide area network) is voice. With standards such as H.323 and SIP users had begun to use the Internet for cheap voice calls using their computers. This marked the beginning of a whole new Voice over IP (VoIP) industry that is seeing the development of new Vole products that include Ethernet telephones, IP PBXs, SoftSwiches and IP/PSTN gateways all geared at seamlessly delivering Vole between enterprises and users. H.323, SIP and MGCP are expected to be the dominant standards here.

Unfortunately, unforeseen technical barriers to the real-world, wide area deployment of H.323 and SIP still exist. The technical barriers relate to the communications infrastructure at the boundaries of IP data networks.

Consequently, today, successful implementation of multimedia or voice communications over IP are confined to Intranets or private managed IP networks.

The problems arise because of two IP technologies—Network Address Translation (NAT) and Firewalls. Security is also an issue when considering solutions to these problems. Where deployments of real-time communications over the data networks transverse shared networks (for example the public Internet), enterprises need to be assured that no compromise to their data security is being made. Current solutions to these problems require the outside or external IP address(es) of enterprise to become public to anyone with whom that enterprises wishes to communicate (voice communications usually includes everyone). The invention presented herein does not suffer this shortfall as enterprises external IP address(es) need only be known to the 'trusted' service provider which is how the public Internet has largely evolved.

NAT has been introduced to solve the 'shortage of addresses' problem. Any endpoint or 'host' in an IP network has an 'IP address' to identify that endpoint so that data packets can be correctly sent or routed to it and packets received from it can be identified from where they originate. At the time of defining the EP address field no-one predicted the massive growth in desktop equipment. After a number of years of global IP deployment, it was realized that the number of endpoints wanting to communicate using the IP protocol would exceed the number of unique EP addresses possible from the address field. To increase the address field and make more addresses available requires the entire IP infrastructure to be upgraded. (The industry is planning to do this with EP Version 6 at some point).

The solution of the day is now referred to as NAT. The first NAT solution, which is referred to as simple NAT in IETF RFC 1631, uses a one-to-one mapping, came about before the World-Wide Web existed and when only a few hosts (e.g. email server, file transfer server) within an organization needed to communicate externally to that organization. NAT allows an enterprise to create a private EP network where each endpoint within that enterprise has an address that is unique only within the enterprise but is not globally unique. These are private IP addresses. This allows each host within an organization to communicate (i.e. address) any other host within the organization. For external communication, a public or globally unique EP address is needed. At the edge of the private IP network is a device that is responsible for translating a private IP address to/from a public IP address—the NAT function. The enterprise will have one or more public addresses belonging exclusively to the enterprise but in general fewer public addresses than hosts are needed either because only a few hosts need to communicate externally or because the number of simultaneous external communications is smaller. A more sophisticated embodiment of NAT has a pool of public IP addresses that are assigned dynamically on a first come first served basis for hosts needing to communicate externally. Fixed network address rules are required in the case where external equipment needs to send unsolicited packets to specific internal equipment.

Today, most private networks use private 1P addresses from the 10.x.x.x address range. External communications are usually via a service provider that offers a service via a managed or shared IP network or via the public Internet. At the boundaries between the public and private networks NAT is applied to change addresses to be unique within the IP network the packets are traversing. Simple NAT changes the complete IP address on a one-to-one mapping that may be permanent or dynamically created for the life of the communication session.

Web Servers, Mail Servers and External servers are examples of hosts that would need a static one-to-one NAT mapping to allow external communications to reach them.

A consequence of NAT is that the private IP address of a host is not visible externally. This adds a level of security.

An extension to simple NAT additionally uses ports for the translation mapping and is often referred to as NAPT (Network Address Port Translation) or PAT (Port Address Translation). A port identifies one end of a point-to-point transport connection between 2 hosts. With mass access to the World-Wide-Web (WWW), the shortage of public IP addresses was again reached because now many desktop machines needed to communicate outside of the private network. The solution as specified in IETF RFC 1631, allows a many-to-one mapping of private IP addresses to public IP address(es) and instead used a unique port assignment (theoretically there are 64 k unique ports on each 1P address) on the public IP address for each connection made from a private device out into the public or shared network. Because of growth of the Internet, PAT is the common method of address translation.

A peculiarity of PAT is that the private IP address/port mapping to public 1P address/port assignments are made dynamically, typically each time a private device makes an outbound connection to the public network. The consequence of PAT is that data cannot travel inbound, that is from the public network to the private network, unless a previous outbound connection has caused such a PAT assignment to exist. Typically, PAT devices do not make the PAT assignments permanent. After a specified 'silence' period has expired, that is when no more inbound data has been received for that outbound initiated connection, the PAT assignment for that connection is unassigned and the port is free to be assigned to a new connection.

While computers and networks connected via a common IP protocol made communications easier, the common protocol also made breaches in privacy and security much easier too. With relatively little computing skill it became possible to access private or confidential data and files and also to corrupt that business information maliciously. The industry's solution to such attacks is to deploy 'firewalls' at the boundaries of private networks.

Firewalls are designed to restrict or 'filter' the type of IP traffic that may pass between the private and public IP networks. Firewalls can apply restrictions through rules at several levels. Restrictions may be applied at the IP address, the Port, the IP transport protocol (TCP or UDP for example) or the application. Restrictions are not symmetrical. Typically a firewall will be programmed to allow more communications from the private network (inside the firewall) to the public network (outside the firewall) than in the other direction.

It is difficult to apply firewall rules just to IP addresses. Any inside host (i.e. your PC) may want to connect to any outside host (a web server) dotted around the globe. To allow further control the concept of a 'well known port' is applied to the problem. A port identifies one end of a point-to-point transport connection between 2 hosts. A 'well known port' is a port that carries one 'known' type of traffic. LANA, the Internet Assigned Number Authority specifies the well known ports and the type of traffic carried over them. For example port 80 has been assigned for web surfing (http protocol) traffic, port 25 Simple Mail Transport Protocol etc.

An example of a firewall filtering rule for Web Surfing would be:

Any inside IP address/any port number may connect to any outside IP address/Port 80 using TCP (Transport Connection protocol) and HTTP (the application protocol for Web Surfing).

The connection is bi-directional so traffic may flow back from the Web Server on the same path. The point is that the connection has to be initiated from the inside.

An example of a firewall filtering rule for email may be:

Any outside IP address/any port number may connect to IP address 192.3.4.5/port 25 using TCP and SMTP.

(Coincidentally, the NAT function may change the destination IP address 192.3.4.5 to 10.6.7.8 which is the inside address of the mail server.)

Filtering rules such as "any inside IP address/any port number may connect to any outside IP address/any port number for TCP or UDP and vice versa" are tantamount to removing the firewall and using a direct connection as it is too broad a filter. Such rules are frowned upon by IT managers.

H.323 has been designed to be independent of the underlying network and transport protocols. Nevertheless, implementation of H.323 in an IP network is possible with the following mapping of the main concepts:

H.323 address: IP address

H.323 logical channel: TCP/UDP Port connection

In the implementation of H.323 over IP, H.323 protocol messages are sent as the payload in EP packets using either TCP or UDP transport protocols. Many of the H.323 messages contain the H.323 address of the originating endpoint or the destination endpoint or both endpoints. Other signaling protocols such as SIP also embed IP addresses within the signaling protocol payload.

However, a problem arises in that NAT functions will change the apparent IP addresses (and ports) of the source and destination hosts without changing the H.323 addresses in the H.323 payload. As the hosts use the H.323 addresses and ports exchanged in the H.323 payload to associate the various received data packets with the call, this causes the H.323 protocol to break and requires intermediary intelligence to manipulate H.323 payload addresses.

Because of the complexity of multimedia communications, H.323 requires several logical channels to be opened between the endpoint. Logical channels are needed for call control, capabilities exchange, audio, video and data. In a simple point-to-point H.323 multimedia session involving just audio and video, at least 6 logical channels are needed. In the IP implementation of H.323, logical channels are mapped to TCP or UDP port connections, many of which are assigned dynamically.

As the firewall functions filter out traffic on ports that they have no rules for, either the firewall is opened, which defeats the purpose of the firewall, or much of the H.323 traffic will not pass through.

Therefore, both NAT and firewall functions between endpoints prevent H.323 (and other real-time protocols, SIP and MGCP for example) communications working. This will typically be the case when the endpoints are in different private networks, when one endpoint is in a private network and the other endpoint is in the Internet or when the endpoints are in different managed IP networks.

H.323 (and SIP, MGCP etc.) communication is therefore an anathema to firewalls. Either a firewall must become H.323 aware or some intermediary intelligence must manipulate the port assignments in a secure manner.

One possible solution to this problem would be a complete 1P H.323 infrastructure upgrade. This requires:

H.323 upgrade to the NAT function at each LP network boundary. The NAT function must scan all H.323 payloads and consistently change 1P addresses.

H.323 upgrade to the firewall function at each EP network boundary. The firewall must understand and watch all H.323 communication so that it can open up the ports that are dynamically assigned and must filter all non-H.323 traffic on those ports.

Deployment of H.323 intelligence at the boundary or in the shared IP network to resolve and arbitrate addresses. IP addresses are rarely used directly by users. In practice, IP address aliases are used. Intelligence is needed to resolve aliases to an IP address. This H.323 function is contained within H.323 entities called Gatekeepers.

The disadvantages of this possible solution are:

Each organization/private network must have the same level of upgrade for H.323 communication to exist.

The upgrade is costly. New functionality or new equipment must be purchased, planned and deployed. IT managers must learn about H.323.

The scale of such a deployment will likely not be readily adaptable to the demands placed on it as the technology is progressively adopted, requiring a larger and more costly initial deployment than initial (perhaps experimental) demand requires.

The continual parsing of H.323 packets to resolve the simple NAT and firewall function places a latency burden on the signal at each network boundary. The latency tolerance for audio and video is very small.

Because there are a multitude of standards for real-time communication and each of the signaling protocols of those standards are different, an enterprise would need multiple upgrades—one for each protocol it wishes to use.

The media is expected to travel directly between enterprises or between an enterprise and a device in the public network. The consequence of this is that the EP addresses of an enterprise become public knowledge. This is regarded as a security compromise as any potential attacker must first discover the enterprises IP address as the first step to launching an attack.

As a result of these problems, the H.323 protocol is not being used for multimedia communications when there is a firewall and/or network address translation (NAT). One approach has been to place H.323 systems on the public side of the firewall and NAT functions. This allows them to use H.323 while also allowing them to protect the remainder of their network. The disadvantages of this are:

1. The most ubiquitous device for video communications is the desktop PC. It is nonsensical to place all desktop computers on the public side.

2. The H.323 systems are not protected from attackers on the public side of the firewall.

3. The companies are not able to take advantage of the potentially ubiquitous nature of H.323, since only the special systems will be allowed to conduct H.323 communications.

4. The companies will not be able to take full advantage of the data-sharing facilities in H.323 because the firewall will prevent the H.323 systems from accessing the data. Opening the firewall to allow data-transfer functions from the H.323 system is not an option because it would allow an attacker to use the H.323 system as a relay.

5. In the emerging Voice over IP (VoIP) market there is a market for telephony devices that connect directly to the data network, for example Ethernet telephones and IP PBXes. By virtue of the desktop nature they are typically deployed on the private network behind firewalls and NAT. Without solutions to the problems described above telephony using these devices is confined to the Enterprises private network or Intranet or must pass through IP-PSTN gateways to reach the outside world.

Thus, what is desired, as recognized by the present inventors, is an ability to allow endpoints (using a real-time protocol, for example H.323, SIP or MGCP) located in different secure and private IP data networks to be able to communicate with each other without compromising the data privacy and data security of the individual private networks.

SUMMARY OF THE INVENTION

The present invention allows endpoints (using a real-time protocol, for example H.323, SIP or MGCP) located in different secure and private IP data networks to be able to communicate with each other without compromising the data privacy and data security of the individual private networks.

The present invention has the advantage of working with existing security functions, firewalls for example, and NAPT (Network Address Port Translation) functions that may occur in firewalls, routers and proxies. The benefit of the invention is that it saves on the costs of upgrading those devices to be fully protocol compliant or deploying additional protocol aware devices. The present invention applies to, for example, those deployments where simple (1-to-1) NAT (Network Address translation) mapping may be applied at the edge of the private networks and/or to deployments where NAPT (Network Address and Port Translation) is applied at the edge of the private networks. The two configurations can coexist and the apparatus can allow communications to take place between private networks following one configuration and private networks following the other configuration. Similarly within a single private network, some terminals may use one configuration (e.g. dedicated room systems) whereas other terminals may use the second configuration (e.g. desktop client PCs). Note that for the purpose of this document NAT will refer to all types of network address translation.

The present invention is illustrated with reference to the ITU H.323 and IETF Session Initiation Protocol (SIP) standards. However, it is equally applicable to other standards or methods that need to dynamically assign ports to carry bi-directional information. It is a benefit of this invention that the private network infrastructure (firewalls and routers) need not be aware of the protocol used for real-time communication. This allows enterprises to deploy apparatus without regard to the protocol. That is not to say that some implementations may provide 'protocol' checking for security or other reasons.

BRIEF DESCRIPTION OF THE DRAWINGS

The invention will be described by way of example, with reference to the accompanying drawings, in which:

FIG. 6 is a diagram depicting an example probe packet of the present invention for SIP;

FIG. 17 is a diagram depicting an example probe packet of the present invention for H.232;

DETAILED DESCRIPTION OF THE PREFERRED EMBODIMENTS

Figure 1:
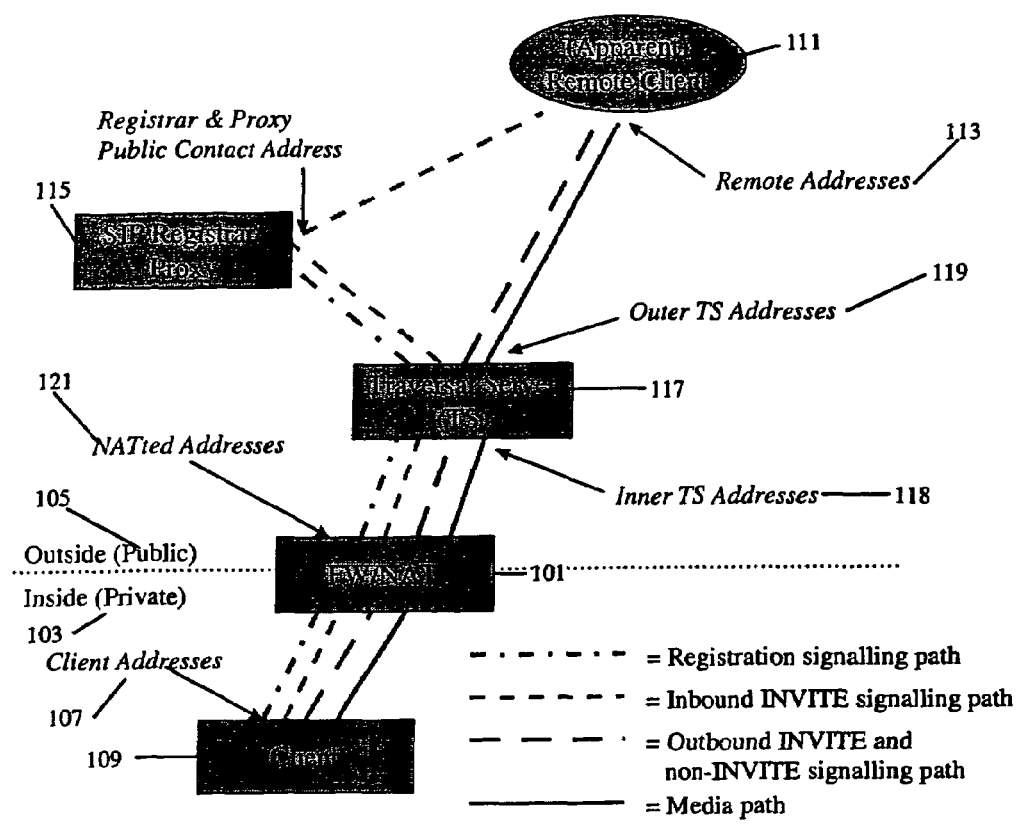
FIG. 1 is a diagram depicting an example traversal architecture of the present invention for SIP.

Referring now to the drawings, wherein like reference numerals designate identical or corresponding parts throughout the several views.

I. Embodiments Relating to SIP

As illustrated in FIG. 1, the firewall and NAT ("FW/NAT" 101) separate the network into Inside 103 and Outside 105 address spaces. Typically the Inside address space is a private address space, and the Outside address space is a public address space. However, the Outside address space may be a separate private address space. The firewall and NAT may be made up of multiple devices, but are shown as a single entity here for convenience. Any Inside address (such as a Client Address 107) used for routing that passes between the Inside address space and the Outside address space will the NATted to an Outside address by the NAT. Addresses so modified are called NATted Addresses.

The Client 109 is located inside the NAT and firewall. The Client Addresses are allocated from the inside address space.

The Remote Client 111 is considered to be in the Outside address space, although the real Remote Client may in fact be behind another NAT. Hence the Remote addresses 113 associated with the Remote Client 111 are the addresses through which the Remote Client is accessible in the Outside address space. For this reason FIG. 1 refers to the Remote Client as the "(Apparent) Remote Client." Any reference to Remote Client hereinafter means the (Apparent) Remote Client.

The SIP Registrar/Proxy 115 is located outside the NAT and firewall. FIG. 1 shows the SIP Registrar and Proxy functions as a single entity. This is purely for convenience and the two functions may be separated into separate devices if desired. The SIP Registrar/Proxy is a standard device.

The Traversal Server 117 is also located outside the NAT and firewall. It has two sets of addresses: Inner TS Addresses 118 and Outer TS Addresses 119. The Inner TS addresses connect to Clients inside the firewall and NAT while the Outer TS Addresses connect to Remote Clients. Both Inner TS Addresses and Outer TS Addresses are allocated from the outside address space. The Traversal Server and the SIP Registrar/Proxy can be co-located.

The present invention enables clients inside the NAT and firewall to communicate with remote clients and proxies in the outside address space. It does this by creating a control channel between the Client 109 and the Traversal Server 117, and by sending probe packets between the Client and Traversal Server that are used to learn the NAT modified addresses.

In brief, the present invention's protocol begins when the Client creates a TLS (Transport Level Security) connection to the Traversal Server, and sends a SIP Register message. The Traversal Server will forward this message to the SIP Registrar/Proxy after modifying the message's 'Contact' header so that the Registrar will contact the Traversal Server when making calls to the Client.

When the SIP Registrar/Proxy 115 receives an INVITE for an incoming call, it forwards the message to the Traversal Server 117. Before forwarding the message to the Client, the Traversal Server modifies the message again, this time including information regarding probe tokens in the SDP part of the message.

On reception of the INVITE message, the Client interprets the extra SDP information and sends probe packets to the Traversal Server 117. The Traversal Server uses the NATted source address of these probe packets to determine where packets received from the Remote Client preferably will be sent so that they will be received by the Client.

The Traversal Server may also add probe information to the 200 OK that the Client sends in response to the INVITE. This allows the Remote Client to send probe packets to validate the source addresses of the packets that it sends.

When the call is complete, the call is terminated in the conventional way and the Traversal Server releases any allocated resources.

I.1. Message Flows

The probe packets sent from a Client to the Traversal Server allow the Traversal Server to learn the NATted Client Addresses 121 that it can use to send media to the Client. The present invention also establishes a persistent TLS control connection between the Client and the Traversal Server that controls access to the system, and over which call signaling messages are sent.

The following sections give a detailed description of how the probe packets and control connection are used by the present invention.

I.2. Registration and Connection Keep-Alive

Figure 2:
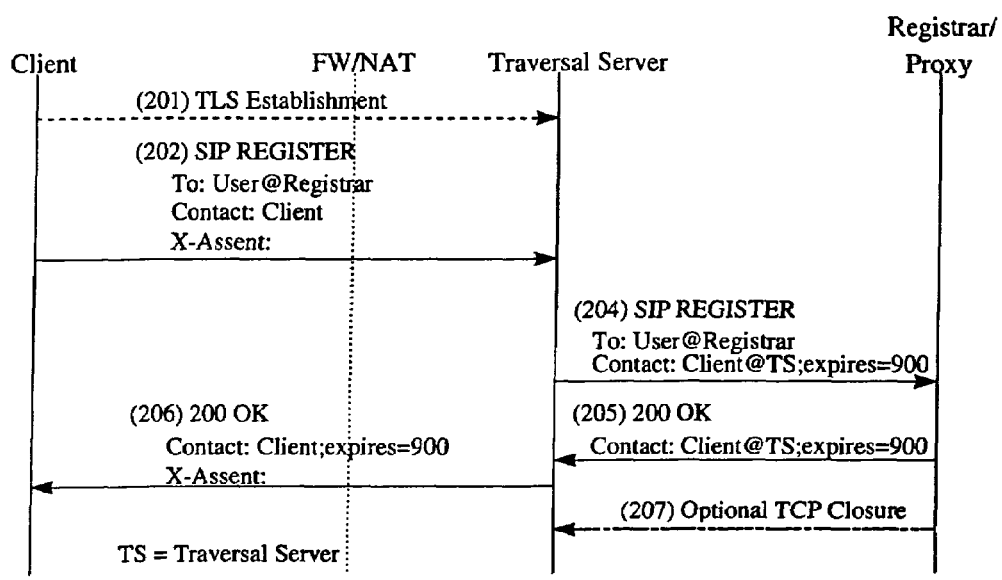
FIG. 2 is a flow chart illustrating the registration and TLS connection keep-alive process of the present invention.

The method by which the Client connects to the Traversal Server and registers with the SIP Registrar/Proxy is explained with reference to FIG. 2.

The Client initiates communication with the Traversal Server by establishing a TLS [TLS] connection to the Traversal Server's Pre-configured public address, typically using the SIP TLS well-known port 5061 (201). The Traversal Server authenticates itself to the Client using its public key as part of the TLS connection setup.

Assuming that the Client is authorized to do so, the TLS connection is maintained between the Client and Traversal Server for the entire period that the Client wishes to receive incoming calls from the SIP Registrar/Proxy. All subsequent SIP signaling between the Client and Traversal Server takes place over this connection.

When the TLS connection is established, the Client sends a SIP REGISTER message (202). This includes a header of the present invention, referred to as an X-Assent header, (see Sec. 1.5 below) that tells the Traversal Server that the Client supports the protocol extensions of the present invention. When the Traversal Server receives the REGISTER message it creates a TCP connection to the SIP Registrar/Proxy. It modifies the Contact header in the REGISTER message so that the SIP Registrar/Proxy will contact it rather than the Client, and adds or modifies the Contact header's 'expires' field so that the Client will re-REGISTER within a period suitable for ensuring that the NAT binding for the TLS connection remains active. Once the REGISTER has been modified, it is forwarded to the SIP Registrar/Proxy (204).

If the SIP Registrar/Proxy accepts the registration it will send a 200 OK (205). The Traversal Server accepts the reception of the registration 200 OK response as the indication that the Client is authorized to make use of its resources. The Traversal Server restores any Contact header location information that it has modified, and inserts the "X-Assent" header (see Sec. 1.5 below). (The term "Assent" is used in software implementations of the present invention to make references to various embodiments of the present invention.) The latter tells the Client that the procedures of the present invention may be required. At this stage in particular, it informs the Client that the TLS connection preferably be maintained after the registration transaction is complete. The resulting message is forwarded to the Client (206).

Some time later the SIP Registrar/Proxy may choose to close the TCP connection with the Traversal Server (207), perhaps in order to save resources.

I.3. Processing an Incoming Call

Figure 3:
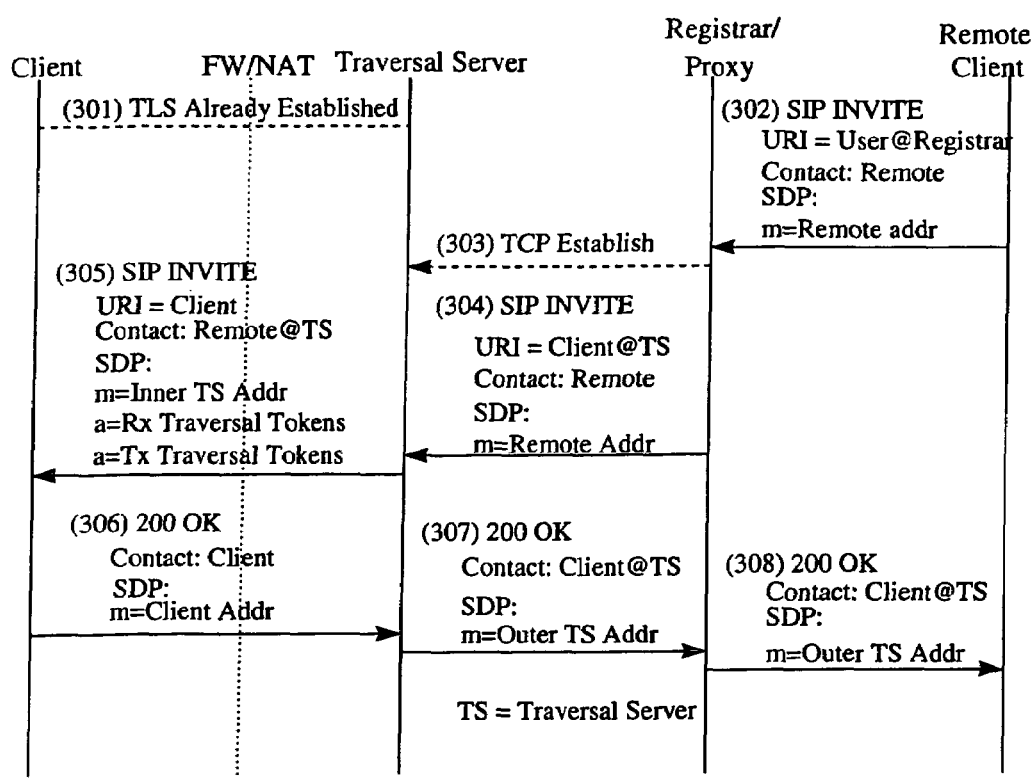
FIG. 3 is a flow chart illustrating the handling an incoming call process of the present invention.

The sequence for handling an incoming call is described with reference to FIG. 3.

As mentioned previously, the TLS connection between the Client and the Traversal Server is maintained throughout the period that the Client wishes to receive incoming calls (301). The main sequence of events begins when the SIP Registrar/Proxy receives an incoming call indication in the form of a SIP INVITE message (302). The SIP Registrar/Proxy will look up the URI, and determine that the INVITE needs to be forwarded to the Traversal Server. If no TCP connection exists between the SIP Registrar/Proxy and the Traversal Server, the SIP Registrar/Proxy creates one (303) and then forwards the INVITE message (304), having changed the INVITE's URI appropriately.

On reception of the INVITE, the Traversal Server does the following:

Change the URI to refer to the Client,

Update the Record Route headers (or modify the Contact header) so that the Client will send future SIP requests to it, rather than attempt to send them direct to the Remote Client, Record the addresses to which media received from the Client is to be sent, Optionally modify the addresses to which the Client preferably sends media so that the Client sends media to the Traversal Server's Inner TS Addresses rather than direct to the Remote Client, Insert extra SDP parameters [SDP] to describe the probe packets of the present invention to be used (the handling of these is described further below).

Two sets of probe information maybe added to the SDP attributes. The first set of probe information (denoted 'rx') is used to determine the NATted addresses through which the Client wishes to receive media. The second optional set of probe information (denoted 'tx') is used to determine the set of NATted addresses from which the Client is transmitting.

The modified INVITE message is sent to the Client (305). Assuming the Client responds to the INVITE by sending a 200 OK (306), the Traversal Server makes the following changes before forwarding the message to the SIP Registrar/Proxy (307):

Update the Record Route headers (or modify the Contact header) so that the Remote Client will send future requests to it rather than attempt to send them direct to the Client, Create ports to form Outer TS Addresses that media from the Remote Client can be received on, Modify the addresses in the SDP to specify the newly created Outer TS Addresses, to avoid the Remote Client attempting to send media direct to the Client.

On reception of the modified 200 OK the SIP Registrar/Proxy forwards it to the Remote Client (308).

The SIP ACK message that follows the 200 OK completes the transaction but it is not shown because the way in which the message is modified and forwarded is essentially the same as for the INVITE message.

Having handled the INVITE transaction, the Client and the Traversal Server completes the steps to prepare for exchanging media.

I.4. Processing an Outgoing Call

Figure 4:
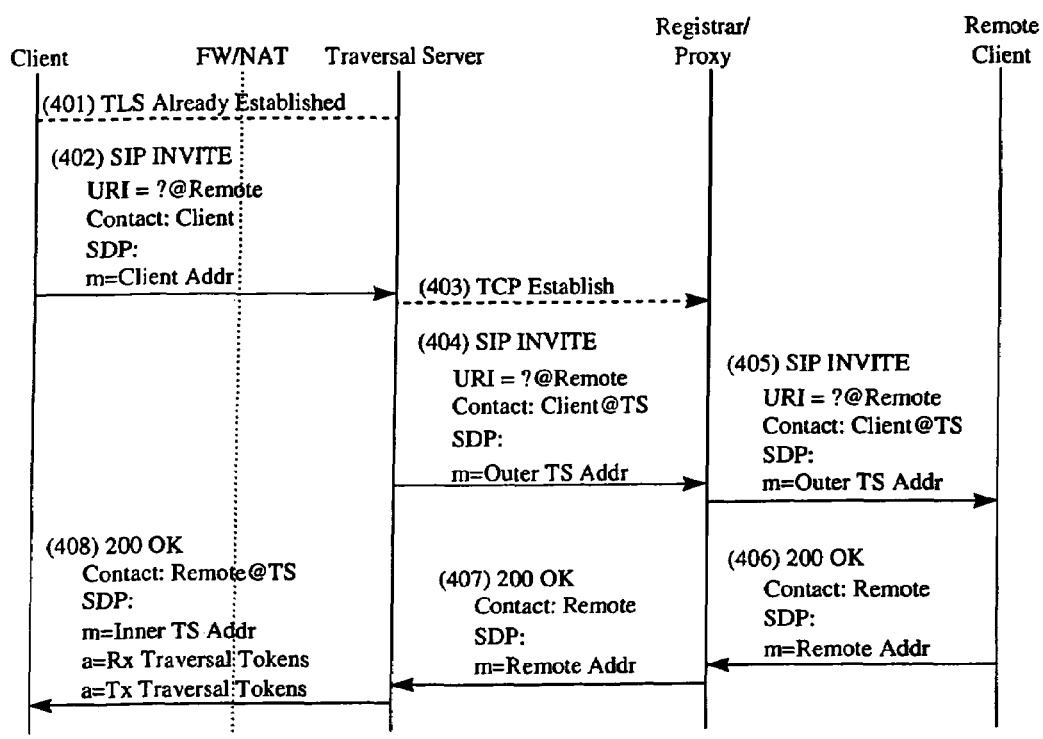
FIG. 4 is a flow chart illustrating the handling an outgoing call process of the present invention.

For an outgoing call, illustrated in FIG. 4, it is once again assumed that the original TLS connection between the Client and the Traversal Server is still open (401), and the Client can use this to send its INVITE message to the Traversal Server (402). If the Traversal Server does not have a TCP connection open to the SIP Registrar/Proxy, it opens one (403). Before forwarding the INVITE to the SIP Registrar/Proxy (404), the Traversal Server does the following:

Update the Record Route headers (or modify the Contact header) so that the Remote Client will send future requests to it rather than attempt to send them direct to the Client, Create ports to form Outer TS Addresses that media from the Remote Client can be received on, Modify the addresses in the SDP to the created Outer TS Addresses, to avoid the Remote Client attempting to send media direct to the Client.

When the SIP Registrar/Proxy receives the message, it forwards the message to the Remote Client (405).

The Remote Client's 200 OK response to the INVITE (406) is forwarded to the Traversal Server by the SIP Registrar/Proxy (407). The Traversal Server makes the following modifications to the response:

Update the Record Route headers (or modify the Contact header) so that the Client will send future SIP requests to it, rather than attempt to send them direct to the Remote Client, Record the addresses to which media received from the Client is to be sent, Modify the addresses to which the Client preferably sends media so that the Client sends media to the Traversal Server's Inner TS Addresses rather than direct to the Remote Client, Insert extra SDP parameters to describe the ASSENT probe packets to be used (the handling of these is described further below).

The modified response is sent to the Client (408).

The INVITE transaction is completed with an ACK message. This is not described, as the processing of this is essentially the same as for the INVITE message.

Once the session signaling has been completed, media exchange is initiated as described in Sec. 1.7.

I.5. SIP Header Format

The SIP header of the present invention indicates that a Client supports the extensions of the present invention when included in a message sent to the Traversal Server, and specifies that the extensions preferably be used when sent from the Traversal Server to the Client. The header may include specific parameters. The definition of the SIP header parameter of the present invention is defined in ABNF [ABNF] as follows:

```
assent-header = "X-Assent" HCOLON [ assent-extension-
params ]
assent-extension-params = generic-param *( SEMI generic-
param )
                ; HCOLON, SEMI & generic-param defined
in [SIP]
```

6. SDP Parameter Format

To convey the probe configuration information between the Traversal Server and the Client, the present invention introduces an additional SDP parameter [SDP]. The SDP parameter of the present invention is a media-level parameter, and a set of parameters of the present invention are included for each SDP m=line that describes RTP based media [RTP] [RTPPROF]. The format of the parameter is defined using ABNF [ABNF] as follows:

```
assent-attribute =          "a = x-assent:" probe-specification
probe-specification =       probe-direction space
                            probe-type space
                            probe-scheme
probe-direction =           "tx"/"rx"
probe-type =                "rtp"/"rtcp"
probe-scheme =              probe-basic-scheme/
                            probe-future-scheme
probe-basic-scheme =        "basic" space probe-token space
                            probe-ack-token
probe-token =               1*(HEXDIG HEXDIG); HEXDIG defined
in [ABNF]
probe-ack-token =           1*(HEXDIG HEXDIG)
probe-future-scheme =       1*ALPHA space *(%x20-7f)
in [ABNF]                      ; ALPHA defined
```

Examples of the SDP attribute for a basic probe of the present invention are:

a=x-assent:rx   rtp    basic   0564fde459ba453c 54d5abc671dfa2b1 a=x-assent:rx   rtcp   basic   67344ca43b4578fc fd23a657900ac893

How this information is used is described in Sec. 1.7 below.

I.7. Establishing the Media

Having exchanged probe informatFion, the Client sends probe packets to the Traversal Server so that the Traversal Server can learn the NATted Addresses to use to send and receive media to/from the Client.

Figure 5:
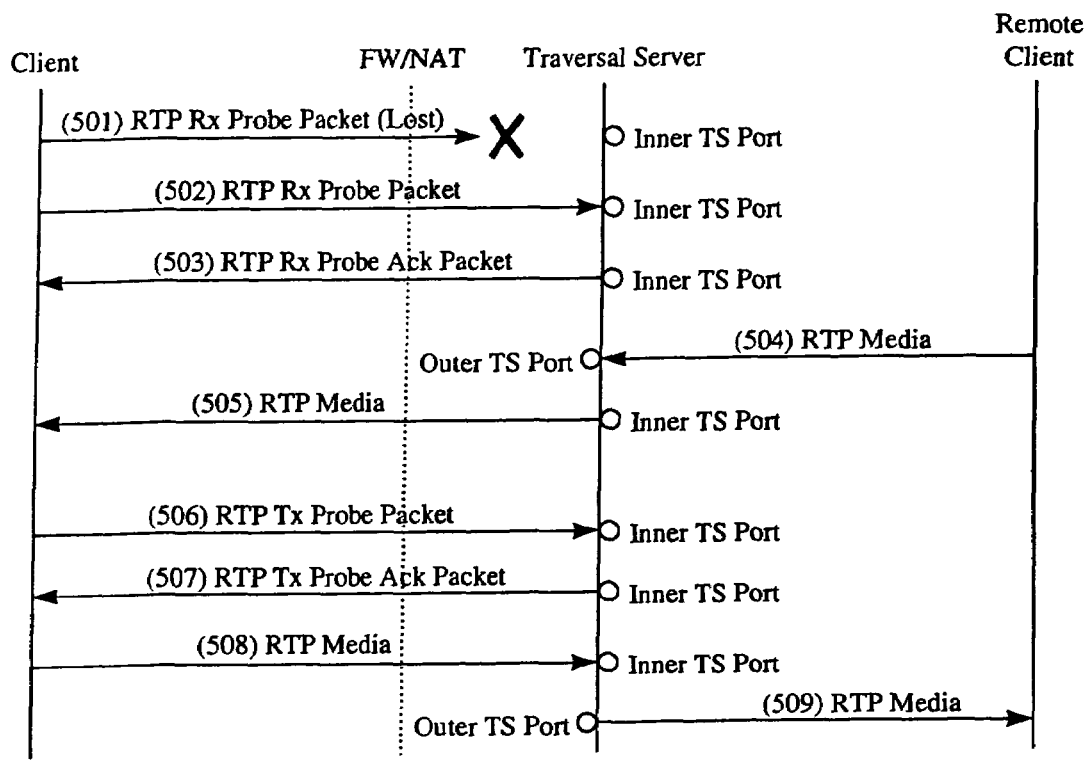
FIG. 5 is a flow chart illustrating the establishing the media process of the present invention.

The sequence of events by which the probe information is used to establish media flows between the clients is shown in FIG. 5. Steps (501) to (505) illustrate the sequence of events the Client invokes to initiate reception of a media stream and steps (506) to (509) show the steps the Client uses for transmitting media.

Establishing the RTP and RTCP flows is essentially identical, except that in some cases slightly different values are used. To avoid repeating the text twice, the sequence is described for RTP, but where a different value is used for establishing the RTCP stream, the RTCP value is placed in angled brackets after the relevant RTP value, for example:

rtp-value<rtcp-value>.

The Client initiates media reception by extracting the probe-token and probe-ack-token from the attribute that has probe-direction set to 'rx' and the probe-typeset to rtp <rtcp>. The Client constructs a probe by converting the hex encoded probe-token into a sequence of bytes, and copying them into a probe packet as described in Sec. 1.8. The constructed probe packet is sent to the address specified in the relevant SDP c=and m=lines (even though SDP normally uses these addresses to specify where media is transmitted to, not received from) (501). The ports that the probe packets are sent to form part of the Traversal Server's Inner TS Addresses.

To allow for packet loss (501), the Client keeps re-transmitting the probe packet (502) until it receives a probe-ack packet (503).

When the Traversal Server does receive the probe packet (502), it correlates the probe token it contains with its internal records to determine to which call the probe packet relates and records the probe packet's source address with the call information. The probe packet's source address is the address to which the Traversal Server will forward media received from the Remote Client for this session.

To signal that no further probe packets are required, the Traversal Server sends a probe-ack packet to the Client. This is constructed in the same way as a probe packet, but contains the probe-ack-token instead of the probe-token (503). The Client checks that the probe-ack packet is valid by ensuring that it contains the correct probe-ack-token.

The Traversal Server now has sufficient information to forward media packets received from the Remote Client (504) to the Client (505).

Note that if a outbound INVITE is forked, the Client may receive media from more than one remote client from the Traversal Server. The Client uses the SSRC in the RTP packets to differentiate the media from the various sources.

The Traversal Server can decide whether the Client sends media direct to the Remote Client, or via itself. If the Traversal Server elects to relay the Client's transmitted media it includes SDP parameters of the present invention with the probe-direction field set to 'tx'.

The mechanism by which the Client transmits media via the Traversal Server is similar to the way it receives media. The Client extracts the probe information specified in the SDP attributes of the present invention that have the probe-direction fields set to 'tx', and sends probe packets from the addresses it will use to transmit media from to the receive addresses specified in the relevant SDP c=and m=lines (506). The Traversal Server acknowledges these with a corresponding probe-ack packet (507). Now, when the Traversal Server receives media from the Client (508), it uses the packet's source and destination addresses to determine the session to which the media relates and it can, using information already stored, correctly forward the media to the Remote Client (509). If the SDP received by the Client does not contain any SDP attributes of the present invention with the probe-direction fields set to Itx', the Client sends media to the addresses specified in the SDP without using the procedures of the present invention.

Note that it is at the discretion of the Client whether it chooses to receive media on the same ports that it transmits from.

I.8. Probe Tokens & Probe Packet Format

Probe tokens of the present invention are selected by the Traversal Server, and preferably unpredictable by an external device even if it has full knowledge of all previously generated probe tokens. Each probe token preferably also be unique over a period sufficient for the Traversal Server to tell apart different connection establishment events. Each probe token can also be encoded/encrypted.

The probe packets of the present invention and probe-ack packets use the same source and destination addresses as the RTP and RTCP packets, so it is preferable to be able to differentiate the two. For example, the probe packets of the present invention can be differentiated from RTP and RTCP packets by their size. The minimum size of an RTP or RTCP packet is 12 bytes. The probe packets of the present invention therefore are preferably less than 12 bytes long. The probe-token and probe-ack-token from the SDP parameters are placed into the probe packets in network byte order. An example probe packet is illustrated in FIG. 6 using the IETF bit numbering convention.

I.9. Media Keep Alive

It is preferable to prevent the media packet NAT bindings timing out in the absence of any media flow. If no packets for a particular NAT binding have passed between the Client and the Traversal Server for a period that may lead to the NAT binding timing out, the Client refreshes the binding by sending the probe packet appropriate to that NAT binding to the Traversal Server. The Client keeps sending the probe packets until the Traversal Server acknowledges the probe packet with the appropriate probe-ack packet, thus ensuring that the binding has been refreshed.

I.10. Finishing the Call

On reception of the 200 OK corresponding to the SIP BYE for a call, the Traversal Server will release any resources that it has allocated to handle the call. This will terminate the relay action of the Traversal Server for that call.

The Traversal Server may also release resources if media and media keep-alive events do not occur for a suitably long period.

In an alternative embodiment, the client may be a SIP Registrar which provides NAT & firewall traversal on behalf of other devices. The Registrar registers with the traversal server in a similar fashion to an endpoint. This registration initiates the communications channel between Registrar and Traversal Server. This channel is used to carry SIP messages, between the Traversal Server and Client. SIP call setups then proceed in the manner described above. SIP call setups then proceed in the manner described above, with the Registrar acting as a relay for signaling. If the endpoint can, and wishes to support firewall traversal, media may run directly between it and the traversal server, otherwise the Registrar will relay the media as well.

II. Embodiments Relating to H.323

Figure 7:
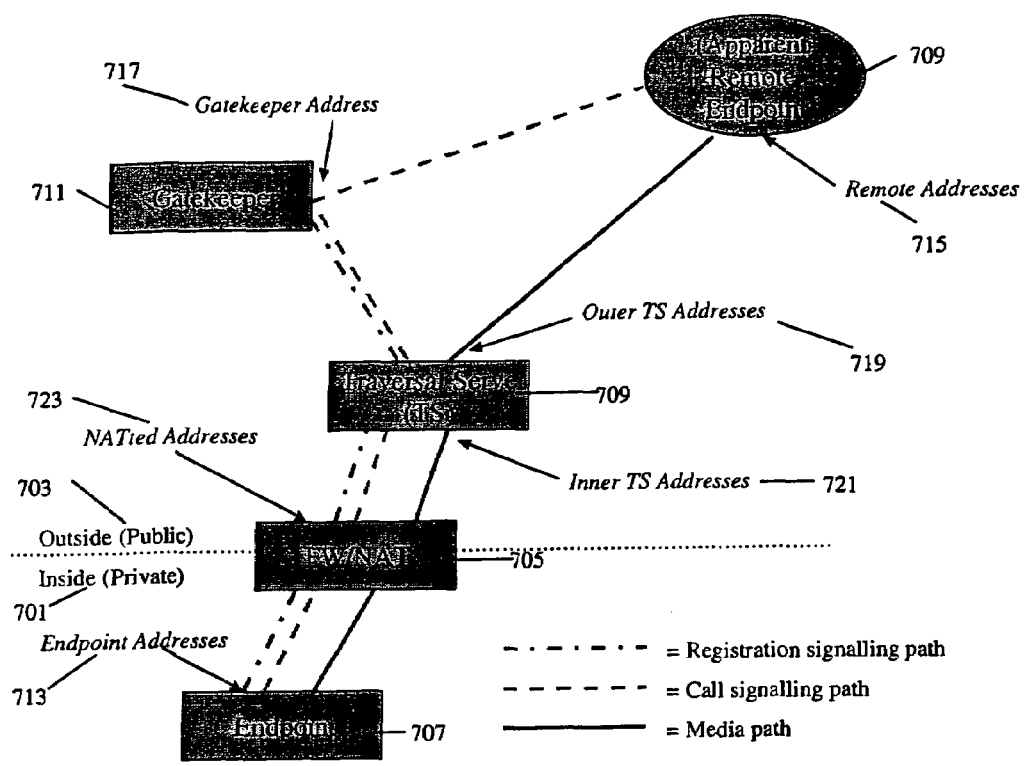
FIG. 7 is a diagram depicting an example traversal architecture of the present invention for H.323.

The present invention also allows endpoints (e.g., clients) in different address spaces to communicate with each other within the H.323 protocol. The basic architecture for this system is shown in FIG. 7. Here, the network is again divided into Inside 701 and Outside 703 networks by a NAT and/or firewall 705. Typically the Inside network will be a private network, and may be managed by a corporation or an individual. The Outside network will typically be a public network such as the Internet, but may alternatively be another private network. Communication is achieved by the Endpoint 707 (e.g., a client) in the Inside network operating in conjunction with a Traversal Server 709 in the outside network. As such, the inside Endpoint and the Traversal Server work together to establish a persistent two way connection across the NAT, and use probe packets to discover the addresses that have been modified by the NAT.

FIG. 7 labels an Endpoint in the outside network as the '(Apparent) Remote Endpoint' 709. This is because the Remote Endpoint 709 may in fact be behind another NAT, and thus be physically located in another address space. If the Remote Endpoint is behind another NAT, it is preferable to be able to access it using addresses from the Outside Address space, perhaps by the Remote Endpoint also using the present invention. Hence the term '(Apparent) Remote Endpoint' is used to refer to the addresses by which the Remote Endpoint can be accessed in the Outside Address space, irrespective of the address space that it is physically located in.

The present invention preferably works in conjunction with a Gatekeeper 711. The Gatekeeper is responsible for handling registrations and call routing. The Gatekeeper can be any standards compliant gatekeeper and does not need to be aware of the modifications made by the present invention.

FIG. 7 also illustrates the locations of the addresses referred to in the following sections. The 'Endpoint Addresses' 713 belong to the Endpoint 707 in the Inside network 701 and are allocated from the Inside address space. The 'Remote Addresses' 715 and 'Gatekeeper Addresses' 717 belong to the (Apparent) Remote Endpoint and the Gatekeeper respectively and are allocated from the Outside address space. The Traversal Server has two sets of addresses: Inner TS Addresses 719 and Outer TS Addresses 721. Both sets of addresses are allocated from the Outside address space. The Inner TS Addresses are used to connect to Endpoints in the Inside network. The Outer TS Addresses connect to entities in the Outside network such as Gatekeepers and Remote Endpoints. The ports for the Outer TS Addresses are dynamically assigned. When IP packets traverse from the Inside address space to the Outside address space, the source addresses of the packets are modified by the NAT. The addresses inserted by the NAT are referred to as 'NATted Addresses' 723. NATted Addresses are allocated from the Outside address space.

II.1. Operation

The present invention operates by establishing a persistent bi-directional control path across the NAT between the Endpoint and the Traversal Server. In addition to allowing the Endpoint to contact the Traversal Server, more significantly this allows the Traversal Server to contact the Endpoint at any time. In the case of the present invention for 11.323 this path is UDP based and is established when the Endpoint registers with the Gatekeeper via the Traversal Server. The present invention also enables the establishment of both inbound and outbound media flows. The present invention uses probe packets sent from the Endpoint addresses on which media is to be received to the Traversal Server to learn the NATted addresses that can be used to send media to the Endpoint.

Each of the sub-sections below describes the various phases of the protocol of the present invention in detail. The present invention requires that some additional information be placed in the standard 11.323 messages.

II.2. NonStandardParameter Content

The present invention requires additional information to be exchanged between the Traversal Server and the Endpoint. This information is conveyed using the NonStandardParameter fields that appear in 11.225 [11225] and 11.245[11245] messages. These fields have the following ASN.1 [ASN1] definition (or equivalent):

```
NonStandardParameter ::= SEQUENCE
{
    nonStandardIdentifier NonStandardIdentifier,
    data        OCTET STRING
}
NonStandardIdentifier ::= CHOICE
{
    object      OBJECT IDENTIFIER,
    h221NonStandard    H221NonStandard,
    ...
}
H221NonStandard ::= SEQUENCE
{
    t35CountryCode      INTEGER(0..255),
    t35Extension        INTEGER(0..255),
    manufacturerCode    INTEGER(0..65535),
}
```

For the present invention, the h221NonStandard variant of NonStandardIdentifier is used with the following values:

t35CountryCode=0xB4
t35Extension=0x00
manufacturerCode=0x5200 where the value following the '0x' prefix is a hexadecimal number.

The data field of the NonStandardParameter is composed of two parts. The first part is used to indicate that the extension is an extension of the present invention rather than any other extension that might use the above T35 country code and manufacturer code it consists of the ASCII values of the character string, e.g.:

ASSENT:

That is, the initial octets have the values, 0x41, 0x53, 0x53, 0x45, 0x4E, 0x54, 0x3A. Immediately following the "ASSENT:" character sequence (and without any intervening terminating character such as \0) is the main part of the data.

This is ASN.1 [ASN1] encoded as per the ASN.1 encoding rules defined for H.225. An example definition of the ASN.1 is as follows:

```
ASSENT-MESSAGES DEFINITIONS AUTOMATIC TAGS ::=
BEGIN
IMPORTS
    NonStandardParameter,
    CallIdentifier,
    TransportAddress
FROM H323-MESSAGES;
ASSENT-Info ::= SEQUENCE
{
    nonStandardParameter    SEQUENCE OF NonStandardParameter,
    operation ASSENT-Operation,
    ...
}
ASSENT-Operation ::= CHOICE
{
    assent-supported     ASSENT-Options,
    transport-request    TCP-Transport-Request,
    probe-info           Probe-Info,
    ...
}
ASSENT-Options ::= SEQUENCE
{
    ...
}
TCP-Transport-Request ::= SEQUENCE
{
    callback-address     TransportAddress,
    probe-token          OCTET STRING, ...
}
Probe-Info ::= CHOICE
{
    rx-probe-info        Rx-Probe-Info,
    tx-probe-info        Tx-Probe-Info,
}
Rx-Probe-Info ::= SEQUENCE
{
    rtp                  In-Probe-Info,
    rtcp                 In-Probe-Info,
    reverse-rtcp         Out-Probe-Info OPTIONAL,
    ...
}
Tx-Probe-Info ::= SEQUENCE
{
    rtp                  Out-Probe-Info OPTIONAL,
    rtcp                 Out-Probe-Info OPTIONAL,
    reverse-rtcp         In-Probe-Info,
    ...
}
In-Probe-Info ::= SEQUENCE
{
    probe-tokens         Probe-Tokens,
    probe-address        TransportAddress,
}
Out-Probe-Info ::= SEQUENCE
{
    probe-tokens         Probe-Tokens,
}
Probe-Tokens ::= SEQUENCE
{
    probe-token          OCTET STRING,
    probe-ack-token      OCTET STRING,
}
END
```

The nonStandardParameter part of ASSENT-Info allows the inclusion of end-to-end nonStandardParameters where the inclusion of the "ASSENT" information would prevent other non-standard information being included (for example in the registration messages).

How these parameters are used is described in the other sections of this document.

II.3. Control Path Establishment and Registration

The present invention creates a persistent control path between the Endpoint and the Traversal Server that can be used to exchange data from either party at any time. In the case of the embodiments for the present invention for H.323, this control channel is UDP based.

Figure 8:
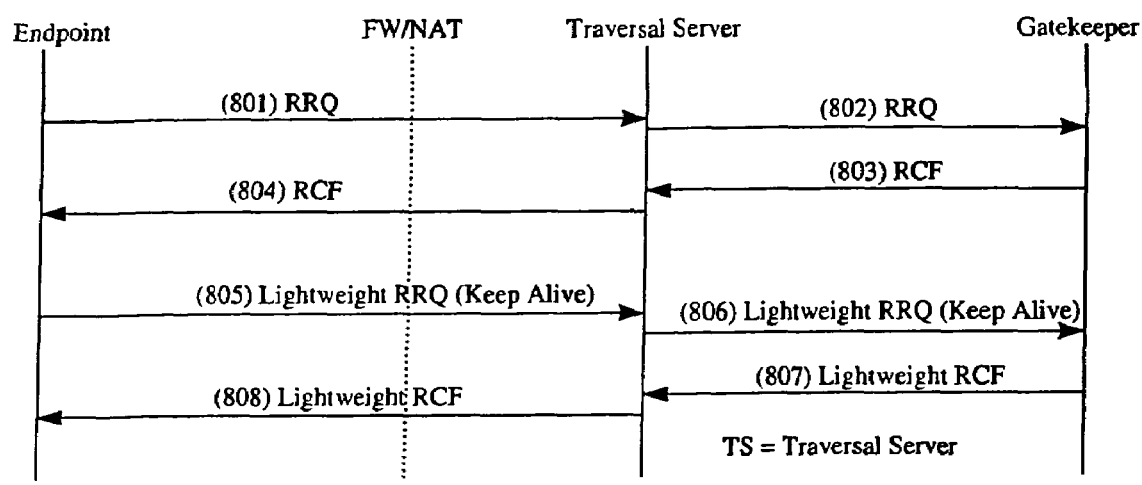
FIG. 8 is a flow chart illustrating the control path establishment and registration process of the present invention.

As shown in FIG. 8, the control path is established when the Endpoint sends a Registration Request message (RRQ to the Traversal Server (801). The registration message preferably contains a nonStandardData parameter to inform the Traversal Server that the Endpoint supports the extensions of the present invention. The nonStandardData parameter contains the ASSENT-Info structure (described in Sec. 11.2 above) with the assent-supported option of the ASSENT-Operation construct present.

On reception of the registration message, the Traversal Server modifies the timeToLive parameter to a value that will ensure that the Endpoint will re-register before the NAT binding for the UDP path expires. Once modified, and having removed the "ASSENT" specific NonStandardData, the RRQ is forwarded to the Gatekeeper (802).

If the Gatekeeper accepts the registration, it responds with a Registration Confirm message (RCF) (803). The Traversal Server accepts this confirmation message as indication that the Endpoint is authorized to use its resources. The Traversal Server inserts a nonStandardData parameter as used in the RRQ into the RCF to indicate that the procedures of the present invention are required, and the message is forwarded to the Endpoint (804).

When the registration period expires, the Endpoint sends a lightweight Registration Request message to the Traversal Server (805). The Endpoint preferably sends the message from the same address and port that it sent the original registration message. This message will refresh the binding in the NAT. The Traversal Server completes the message exchange by forwarding the message to the Gatekeeper (806), and forwarding the response from the Gatekeeper (807) to the Endpoint (808).

By following this procedure the Endpoint is registered with the Gatekeeper, and a persistent UDP path is established between the Traversal Server and the Endpoint that allows the Traversal Server is send messages to the Endpoint at any time.

II.4. Outgoing Call Signaling

Figure 9:
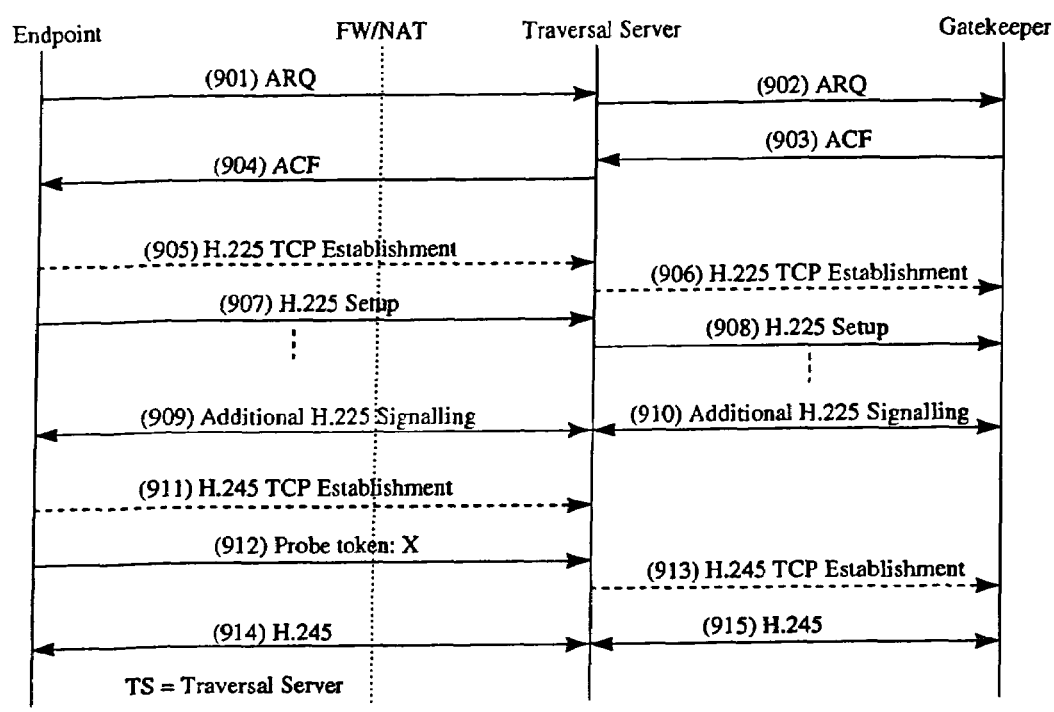
FIG. 9 is a flow chart illustrating the making an outgoing call process of the present invention.

The signaling phase for an outgoing call in the present invention is much the same as for a normal call without the present invention. The sequence of events is shown in FIG. 9.

The Endpoint starts by performing an Admissions Request/Admissions Confirm exchange with the Gatekeeper via the Traversal Server (901)(902)(903)(904). It is not necessary for the ARQ to come from the same port from which the RRQ was sent.

Given permission to the make the call, the Endpoint establishes a TCP connection to the H.225 well-known port (e.g., 1720) on the Traversal Server (905), and the Traversal Server creates an onward TCP connection to the Gatekeeper (906). The Endpoint uses this connection to send its H.225 Setup message (907), which the Traversal Server forwards to the Gatekeeper (908). Additional H.225 call signaling messages are exchanged in the same manner (909)(910).

If the session requires an H.245 connection to be established, the Traversal Server will receive an H.245 address from the Gatekeeper in the H.225 signaling. In this situation, the Traversal Server acts in much the same way as a gatekeeper would. It creates a listening TCP socket, and modifies the address in the H.225 message accordingly before forwarding it to the Endpoint. The Traversal Server may also include the probe information of the present invention in the message that contains the H.245 address. If so, the transport-request variant of the data structure of the present invention will be contained in a nonStandardControl parameter. The address contained in the transport-request construct will be the same as the H.245 address in the main message. The Endpoint will create a TCP connection to the Traversal Server (911), and, if the Traversal Server contained probe information, the Endpoint preferably immediately sends the bytes corresponding to the specified probe token, formatted as specified in Sec. 11.12 below, over the newly created connection. On reception of the TCP connection, and any relevant probe tokens, the Traversal Server will use the address supplied by the Gatekeeper to make a TCP connection to the Gatekeeper (913). The Traversal Server does not forward the probe tokens to the Gatekeeper. H.245 message can now be exchanged (914)(915). Having exchanged the outgoing call signaling, it is preferable to establish the media. This is described in Sec. 11.6 and Sec. 11.7 below.

II.5. Incoming Call Signaling

Figure 10:
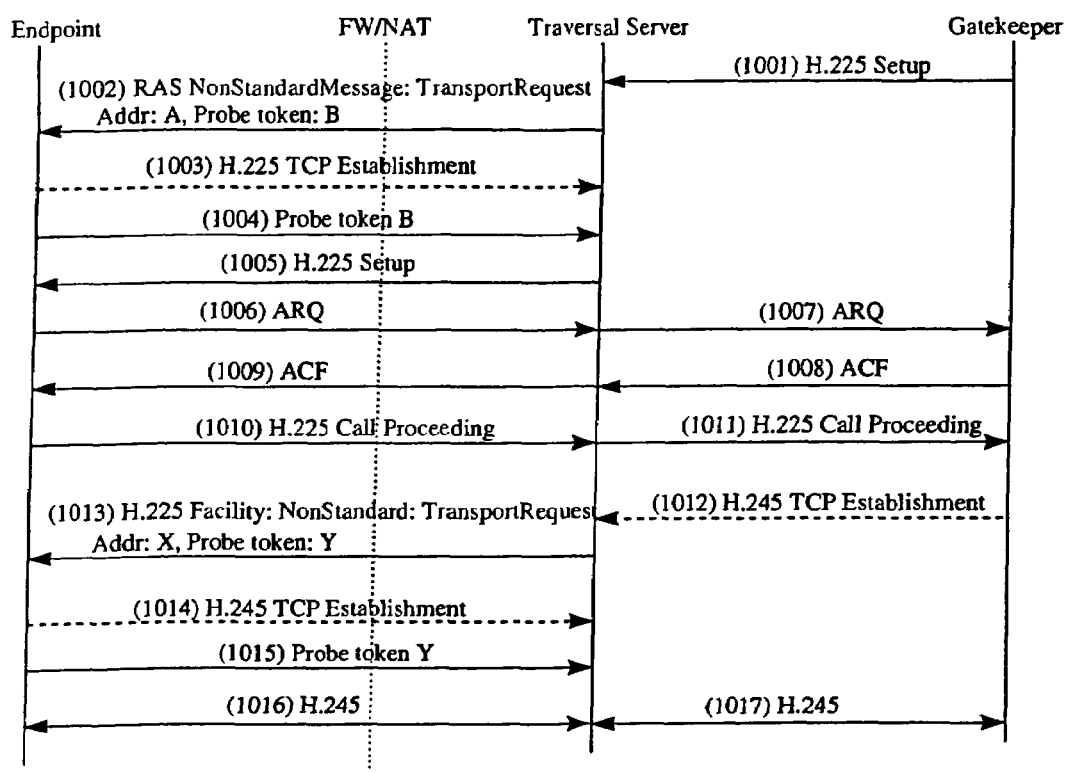
FIG. 10 is a flow chart illustrating the receiving an incoming call process of the present invention.

In the present invention, the sequence of events for incoming call signaling is similar to the normal incoming call sequence of events except for the establishment of TCP connections between the Endpoint and the Traversal Server. Because of the NAT, the Traversal Server is unable to directly establish TCP connections to the Endpoint. The Traversal Server therefore sends a nonStandard RAS message to the Endpoint via the control path established using the procedures described in Sec. 11.3 above, or an H.225 Facility message requesting that the Endpoint create a TCP connection to it. The resulting sequence of events is shown in FIG. 10.

When the Traversal Server receives an H.225 Setup message from the Gatekeeper (1001) it sends a message to the endpoint requesting a rendezvous TCP connection (1002). The message sent by the Traversal Server is a RAS NonStandardMessage. The nonStandardData parameter of the message contains the data defined in Sec. 11.2 with the ASNA part containing the transport-request variant. The message also contains the dynamically allocated TCP address on the Traversal Server to which the Endpoint is to be connected, and a probe token value. The value contained in the requestSegNum parameter has no significance. To allow for the unreliable nature of UDP, the Traversal Server will keep re-transmitting the message until it receives a TCP connection on the specified port. When the Endpoint receives the message, if it has not already created a connection corresponding to the specified address and probe token then it preferably does so (1003). Once the TCP connection has been established, the Endpoint transmits the sequence of bytes corresponding to the specified probe token, formatted according to Sec. 11.12, over the newly created TCP connection (1004). This allows the Traversal Server to validate the identity of the connection. The probe token bytes are not forwarded to the Gatekeeper. The Traversal Server can now forward the H.225 Setup message (1005) and the exchange of messages temporarily follows the normal H.323 message sequence from step 1006 to 1011.

If the Endpoint wishes to establish an H.245 channel, it includes an H.245 address in one of the H.225 messages sent to the Traversal Server (1010). The value of this address is arbitrary and the actual value is not used. When the Traversal Server receives an H.225 message containing such an address, it creates its own dynamically allocated TCP listener, and includes the listeners address in the forwarded H.225 message (1011). When the Gatekeeper establishes a TCP connection to the Traversal Server's TCP listener (1012), the Traversal Server dynamically creates another TCP listener, and sends an H.225 Facility message requesting that the Endpoint connect to the newly created listener (1013). The Facility message contains a NonStandardParameter element in the nonStandardControl parameter. This contains the data defined in Sec. 11.2 with the ASNA part containing the transport-request variant. This in turn contains the address on the Traversal Server to which the Endpoint is to be connected, and a probe token value. To complete the connection establishment, the Endpoint creates a TCP connection to the specified Traversal Server address (1014), and immediately sends the bytes corresponding to the probe token, encoded as described in Sec. 11.12, over the established TCP connection (1015). The probe token allows the Traversal Server to associate the connection with the appropriate call, and is not forwarded to the Gatekeeper. It is then possible to exchange H.245 messages between the parties (1016)(1017).

Once the signaling has been exchanged, media is established as described in Sec. 11.6 and Sec. IL7.

II.6. Signaling for Outgoing Media Establishment Using H.245

Figure 11:
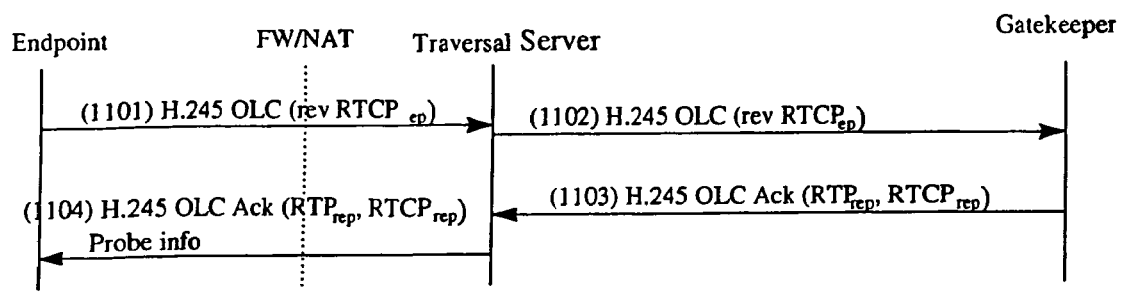
FIG. 11 is a flow chart illustrating the signaling for outgoing media establishment process of the present invention.

An endpoint can establish outgoing media using H.245 with the H.245 signaling on a separate transport connection, or tunneled through H.225. Establishing an outgoing media session involves creating an outward RTP data path, an outward RTCP path and an inward reverse RTCP path. In theory it is possible for the outgoing data paths to go direct from the inside Endpoint to the Remote Endpoint. However, the Traversal Server may elect to relay outgoing data. This Section describes the signaling aspects of setting up such data paths, which is illustrated in FIG. 11.

The Endpoint begins by sending a normal H.245 OpenLogicalChannel message to the Traversal Server (1101). The message preferably contains an address for the reverse RTCP path in the H2250LogicalChannelParameters construct. The Traversal Server may ignore this value, but it preferably still contains the address allocated by the Endpoint for receiving the reverse RTCP data to allow for future optimizations. The Traversal Server creates a dynamically allocated Outer TS Address to receive the reserve RTCP on, places the address in the H.245 message, and forwards the message to the Gatekeeper (1102).

On reception of the H.245 OpenLogicalChannelAck message from the Gatekeeper (1103), the Traversal Server adds a nonStandard parameter containing an instance of the control data of the present invention (as specified in Sec. 11.2) to the H.245 H2250LogicalChannelAckParameters construct. The control information of the present invention includes an instance of Tx-Probe-Info, which in turn contains a reverse-rtcp parameter of type In-Probe-Info used to specify the inward path for the reverse RTCP data. The In-Probe-Info construct contains the tokens for the probe and probe-ack packets and the Inner TS Address where the probe packet preferably be sent. How this information is used is described in Sec. II.11.

If the Traversal Server elects to forward the outward RTP and RTCP, it also does the following:

Record the addresses to where the RTP and forward RTCP received from the Endpoint preferably be forwarded, Modify the addresses in the H2250LogicalChannel Parameters construct so that the RTP and RTCP will be sent to the Traversal Servers Inner TS Addresses, Adds probe token information to the rtp and rtcp parameters of the Tx-Probe-Info construct.

Once the H.245 OpenLogicalChannelAck message is encoded it is forwarded to the Endpoint (1104).

Once the signaling phase of setting up the outgoing media is complete, the Endpoint and the Traversal Server need to complete the data paths using the procedures described in Sec. 11.10 and Sec. 11.11.

II.7. Signaling for Incoming Media Establishment Using

Figure 12:
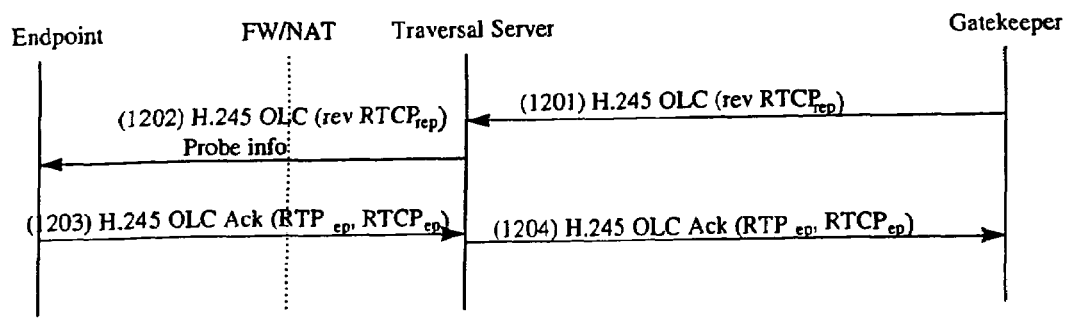
FIG. 12 is a flow chart illustrating the signaling for establishing incoming media process of the present invention.

An incoming media session consists of inward RTP data, inward RTCP data and outward reverse RTCP data. For the Endpoint to receive inward data it is preferable to create a new NAT binding. The outward reverse RTCP data may pass directly from the inside Endpoint to the Remote Endpoint. However, the Traversal Server may elect to relay the outward reverse RTCP data. The H.245 signaling can take place on a separate transport connection, or be tunneled through the H.225. This section describes the sequence of signaling events for establishing incoming media with reference to FIG. 12.

Establishment of incoming media begins when the Traversal Server receives an H.245 OpenLogicalChannelRequest message from the Gatekeeper (1201). When the Traversal Server receives the message it adds a nonstandard parameter to the H2250LogicalChannelParameters. The nonstandard parameter contains the information specified in Sec. 11.2 with choices chosen to contain an instance of rx-probe-info. The Rx-Probe-Info construct contains probe information for the inward RTP data in the rtp parameter and for the inward RTCP data in the rtcp parameter. Both the rtp and rtcp parameters are of the type In-Probe-Info. This type specifies the tokens to be used in the probe packet and probe-ack packets, and the Inner TS Address on the Traversal Server to which the Endpoint is to send the probe packets. Sec. II.11 describes how the probe information is used.

Additionally, the Traversal Server may decide to relay the outward reverse RTCP data. If it does so, it records the address from the H.245 OpenLogicalChannel specifying where the reverse RTCP data preferably be forwarded to, and populates the field with the Inner TS Address on which it wishes to receive the reverse RTCP data. It then includes probe information for the outward RTCP in the reverse-rtcp parameter of the Rx-Probe-Info construct. How this information is used is described in Sec. 11.10.

The modified OpenLogicalChannel message is forwarded to the Endpoint (1202).

If the Endpoint accepts the channel it responds with an OpenLogicalChannelAck message (1203). The message preferably contains addresses for the RTP and RTCP paths in the H2250LogicalChannelAckParameters construct. The Traversal Server may ignore these values, but they preferably still contain the addresses allocated by the Endpoint for receiving the respective data to allow for future optimizations.

The Traversal Server dynamically creates Outer TS Addresses on which to receive the RTP and RTCP data from the Remote Endpoint and inserts the address information into the H.245 OpenLogicalChannelAck message.

The modified OpenLogicalChannelAck message is forwarded to the Remote Endpoint (1204).

Once the signaling phase of setting up the incoming media is complete, the Endpoint and the Traversal Server need to complete the data paths using the procedures described in Sec. II.10 and Sec. II.11.

II.8. Media Establishment Using Fast Connect—Making a Call

Figure 13:
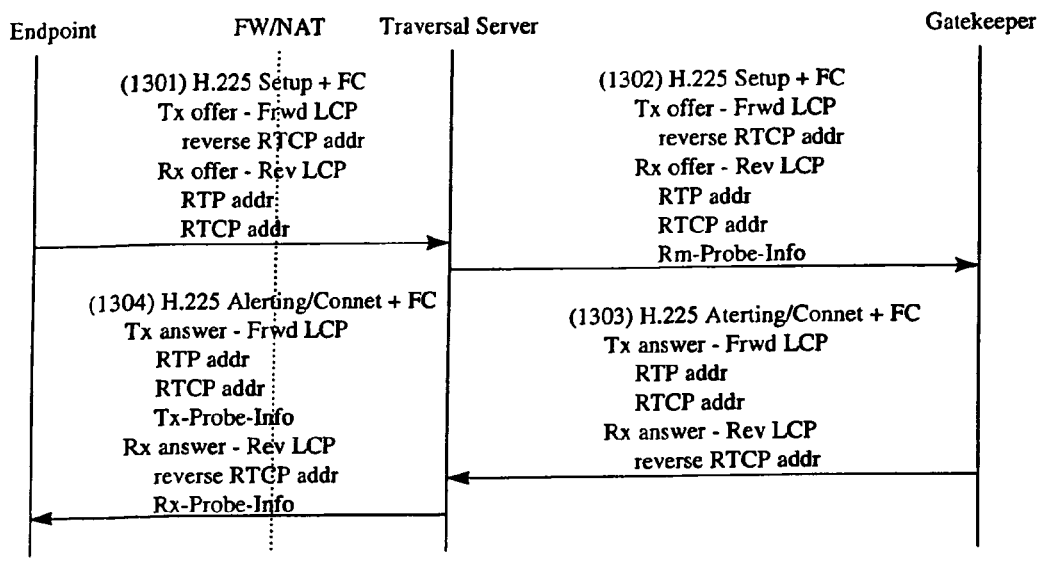
FIG. 13 is a flow chart illustrating the media establishment using fast connect-making a call process of the present invention.

The present invention can also be used with H.323 fast connect. The sequence of events for the present invention augmented fast connect is the same as for normal fast connect except that the additional information of the present invention augments the addressing information conveyed in the exchange. The additional information of the present invention is again conveyed in the nonStandard parameter of the H2250LogicalChannelParameters construct as described in Sec. 111.2. The procedure is described here with reference to FIG. 13.

To make a call using fast connect, the Endpoint constructs an H.225 Setup containing a fast start element. Each OCTET STRING comprising the fast start element contains either an offer to transmit media or an offer to receive media. The constructed Setup is sent to the Traversal Server (1301).

For each unique set of transmit and receive addresses in the offers, the Traversal Server dynamically allocates Outer TS Addresses. The Traversal Server changes the addresses in the offers to the values of its created Outer TS Addresses before forwarding the message (1302).

Subsequent H.225 messages from the Gatekeeper preferably contains the answers to the offers selected by the Remote Endpoint. The Traversal Server preferably adds the information of the present invention containing the Tx-Probe-Info construct to each answer to a transmit offer, and the information of the present invention containing an Rx-Probe-Info construct to each answer to a receive offer. If the Traversal Server chooses to relay media sent by the Endpoint, it records the addresses where the data is to be sent and changes the addresses in the message to specify the relevant Inner TS Addresses. The information of the present invention structures will also contain relevant information for probing. The modified message is sent to the Endpoint (1304). Having forwarded the message, the Traversal Server can release any resources allocated for offers that the Remote Endpoint did not select.

The Endpoint and the Traversal Server complete media setup using the procedures of Sec. II.10 and Sec. II.11.

II.9. Media Establishment Using Fast Connect—Answering a Call

Figure 14:
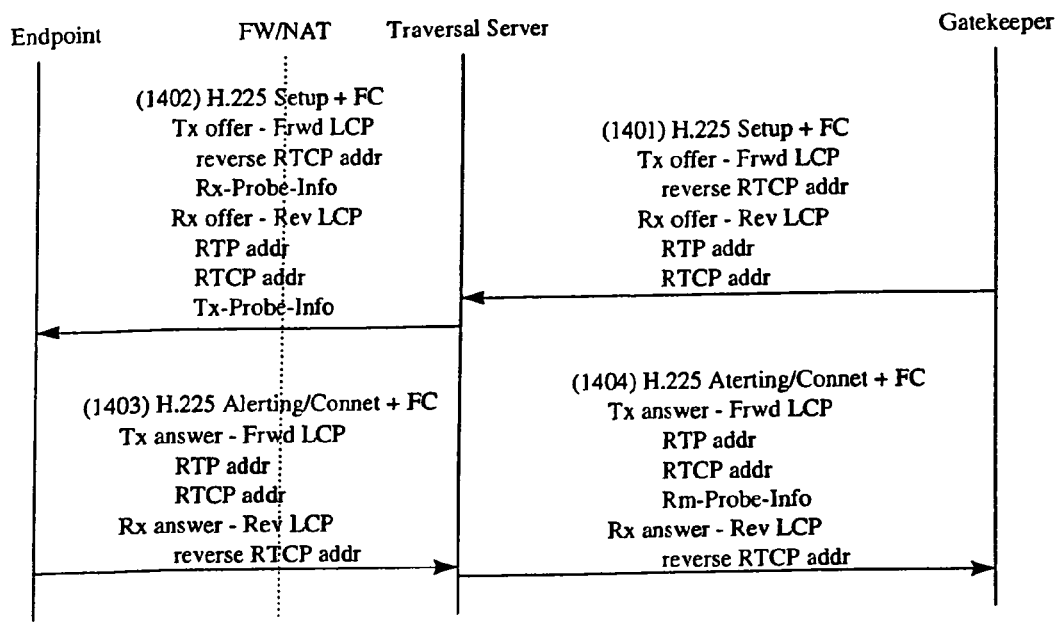
FIG. 14 is a flow chart illustrating the media establishment using fast connect-answering a call process of the present invention.

When using embodiments of the present invention for an incoming calls with Fast Connect, the following sequence of events, described with reference to FIG. 14, takes place.

The Traversal Server will receive from the Gatekeeper an H.225 Setup message containing the fast start offers (1401).

For each unique address in a transmit offer, the Traversal Server creates an instance of the data of the present invention containing an Rx-Probe-I of o construct, and includes a copy of it in each offer that the address appears. The Traversal Server does a similar exercise for each unique set of addresses in a receive offer, but in this case the information of the present invention includes a Tx-Probe-Info construct.

If the Traversal Server elects to relay the media data sent by the Endpoint, it records the addresses to where the data preferably be forwarded and modifies the mediaChannel and mediaControlChannel addresses in the H2250LogicalChannelParameters part of the offer to specify the appropriate Inner TS Addresses.

The modified message is sent to the Endpoint (1402). If the Endpoint accepts the call, and supports fast connect, its response messages will contain answers to the caller's offers (1403).

For each answer to a transmit offer, the Traversal Server dynamically allocates Outer TS Addresses to receive the RTP and RTCP. For each answer to a receive offer, the Traversal Server dynamically allocates an Outer TS Address to receive the reverse RTCP. The Traversal Server changes the addresses in the answers to the offers to be the created Outer TS Addresses, and forwards the message to the Gatekeeper (1404).

The Endpoint and the Traversal Server complete media setup using the information of the present invention by following the procedures described in Sec. 11.10 and Sec. 11.11.

II.10. Outward Path Probing

In theory it is possible for outgoing media data to go direct from the Endpoint in the Inside address space to the Remote Endpoint. However, the Traversal Server may elect to relay the outward data. If it does so, the H.245 signaling will contain Out-Probe-Info parameters corresponding to the RTP and/or RTCP data describing the outward probing that needs to be done.

Figure 15:
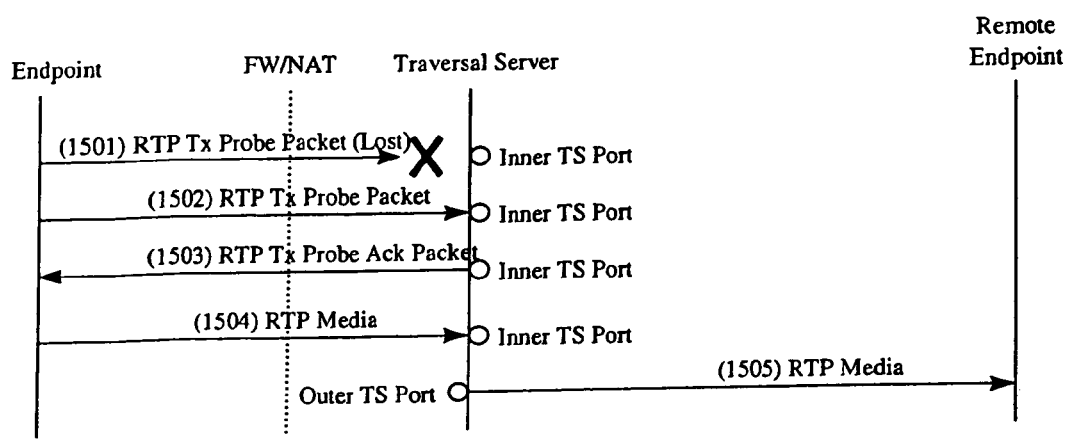
FIG. 15 is a flow chart illustrating the outward path probing process of the present invention.

This section describes the probing procedure for a single data path. If both outward RTP and RTCP are required, two instances of this procedure preferably be implemented using the appropriate probe values in the Out-Probe-Info construct. This section, and the accompanying FIG. 15, describes the probing operation for an RTP data flow. The RTCP sequence is similar.

When the Endpoint receives probe information contained in an Out-Probe-Info construct, it sends probe packets from the address from which it will send RTP (or RTCP) packets to the corresponding address specified in the H2250LogicalChannelAckParameters construct. The probe packets are constructed as described in Sec. II.12 using the probe-token values contained in the probe-tokens elements of the Out-Probe-Info construct. To allow for UDP packet loss, the Endpoint keeps sending probe packets (1501)(1502) until a corresponding probe-ack packet is received (1503). The values that the Traversal Server will place in the probe-ack packet is specified in the probe-ack-token value of the probe-tokens element of the Out-Probe-Info construct.

The Traversal Server uses the token in the probe packets to validate the data path. The Traversal Server records the source address of the probe packets, and associates any future packets received on the relevant Inner TS Address from that source address with the same data path (1504). Using information previously stored from the H.245 OpenLogiclChannelAck message, the Traversal Server is able to forward the received data packets to the correct location (1505).

II.11. Inward Path Probing

When media data (either RTP, forward RTCP or reverse RTCP) needs to be forwarded from the Traversal Server to the Endpoint, it is preferable to create a suitable address binding in the NAT. This is done by the Endpoint sending probe packets to the Traversal Server.

Figure 16:
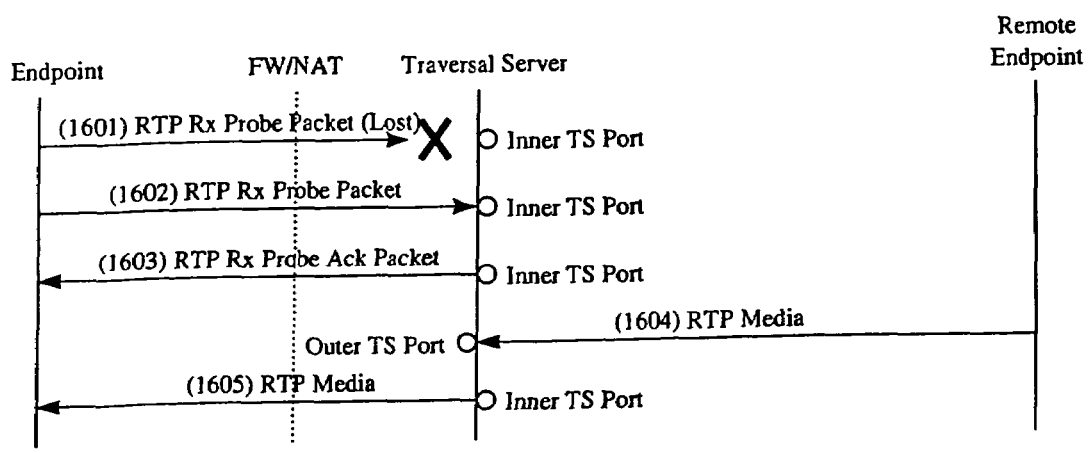
FIG. 16 is a flow chart illustrating the inward path probing process of the present invention.

This section, along with FIG. 16, describes the inward path probing procedure. Note that to simplify the text and the Figure the description is only from the perspective of setting up an inward RTP flow. The RTCP sequence is similar.

Probe information for an inward RTP (or RTCP) data path is contained in an instance of the In-Probe-Info construct. This contains the tokens to be used in the probe packets and probe-ack packets, and also the address to which the Endpoint is to send the probe packets. The Endpoint constructs a probe packet as described in Sec. 11.12 using the probe-token value in the relevant In-Probe-Info construct. The probe packet is sent to the address specified in the probe-address parameter of In-Probe-Info (1601). To allow for UDP packet loss, the Endpoint keeps re-transmitting the probe packet (1602) until the corresponding probe-ack packet is received (1603).

The Traversal Server uses the token in the probe packet to validate the data path. The Traversal Server stores the NATted source address of the probe packet with the data path information so that when RTP or RTCP media packets are received from the Remote Endpoint (4) it can use the stored NATted address to forward them to the Endpoint (1605).

II.12. Probe Tokens & Probe Packet Format

The probe packets of the present invention and probe-ack packets use the same source and destination addresses as the RTP and RTCP packets, so it is preferable to be able to differentiate the two. The probe packets of the present invention are preferably differentiated from RTP and RTCP packets by their size. The minimum size of an RTP or RTCP packet is 12 bytes. The probe packets of the present invention therefore are preferably less than 12 bytes long. The probe-token and probe-ack-token from the non standard H.245 parameters are placed into the probe packets in network byte order.

An example probe packet for the probe token 0xO564fde459ba453c is illustrated in FIG. 17 using the IETF bit numbering convention.

Probe tokens may also be used in the setup of TCP connections. In this case, the first set of bytes transmitted over the connection by the entity establishing the connection (typically the Endpoint) correspond to the value of the probe token. The bytes representing the probe token are formatted in the same way as for a UDP probe packet. The values of the probe tokens are selected by the Traversal Server, and preferably be unpredictable by an external device even if it has full knowledge of all previously generated probe tokens. Each probe token preferably also be unique over a period sufficient for the Traversal Server to tell apart different connection establishment events. Each probe token can also be encoded/ encrypted.

II.13. TCP Signaling Keep Alive

Figure 18:
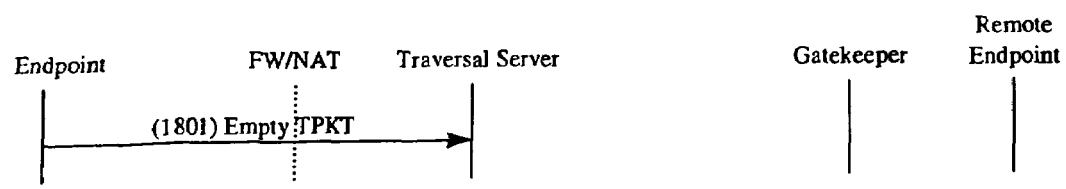
FIG. 18 is a flow chart illustrating the H.225/H.245 TCP keep-alive procedure process of the present invention.

TCP connections between the Endpoint and Traversal Server may be inactive for periods that may cause the NAT to release the bindings for the connections. To ensure that this does not happen, the Endpoint preferably ensures that the NAT bindings are refreshed at suitable periods. Sending a normal message can do this. However, if no such message is appropriate at the time a refresh is required an alternative mechanism for refreshing the binding preferably be employed. As random packets can not be inserted into a TCP stream to refresh the bindings, the present invention requires that an appropriate NAT binding refresh sequence be defined for each protocol that is communicated over TCP. In the case of H.225 and H.245 NAT refresh is accomplished by the Endpoint sending an empty TPKT (consisting solely of the bytes 0x03, 0x00, 0x00, 0x04) to the Traversal Server. If the Traversal Server receives such an empty TPKT it discards it and does not forward it to the Gatekeeper. There is no need for the Traversal Server to acknowledge the empty TPKT at the application level as this will be done by the TCP layer. The H.225/H.245 TCP NAT binding refresh procedure is illustrated in FIG. 18.

II.14. Media Keen Alive

If media corresponding to a particular NAT binding has not been exchanged for a period that may result in the NAT binding expiring, the Endpoint preferably refreshes the NAT binding by sending a probe packet to the Traversal Server. The probe packet preferably contains the probe token used when the binding was initially established. The Endpoint preferably keeps transmitting the probe packet at suitable intervals until it receives the corresponding probe-ack packet from the Traversal Server.

II.15. Terminating a Call

When a call is terminated the Traversal Server releases the TCP resources using the same procedures as if it were a gatekeeper. When the final TCP resources are released, the Traversal Server releases any resources allocated to relaying the media.

In an alternative embodiment, the client may be an H.323 gatekeeper which provides NAT & firewall traversal on behalf of other devices. The gatekeeper registers with the traversal server in a similar fashion to an endpoint. This registration initiates the communications channel between gatekeeper and Traversal Server.

The gatekeeper and traversal server may be configured as neighbors. If this is done, then they may issue location requests (LRQs) to each other to determine if an endpoint is registered at either location. If that endpoint is so registered, and is not capable of supporting firewall traversal itself, the device responding to the LRQ will act as proxy for signaling and media. If the endpoint can, and wishes to support firewall traversal, then the H.225 signaling will be routed through the gatekeeper, other signaling and media may run directly to the traversal server.

In general, it should be emphasized that the various components of embodiments of the present invention can be implemented in hardware, software or a combination thereof. For example, the client can be part of a cell phone, a conference phone, a computer, etc, and the server can be part of a base station. Any presently available or future developed computer software language and/or hardware components can be employed in such embodiments of the present invention. For example, at least some of the functionality mentioned above could be implemented using Visual Basic, C, C++, or any assembly language appropriate in view of the processor(s) being used. It could also be written in an interpretive environment such as Java and transported to multiple destinations to various users.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Figure 19:
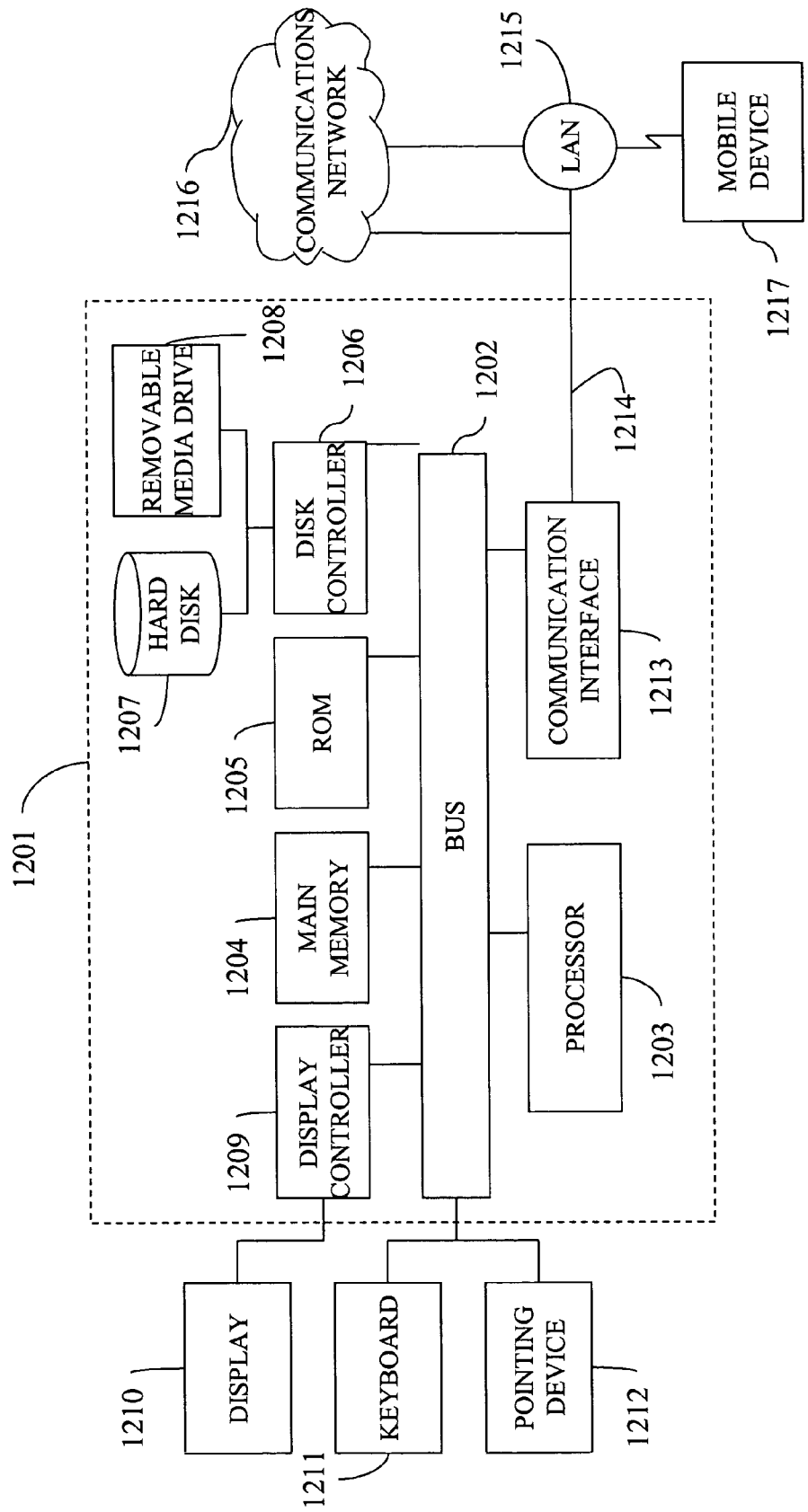
FIG. 19 is a functional block diagram of a generic computing device associated the present invention.

FIG. 19 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The invention claimed is:

1. A method for transferring multimedia information over Internet protocol (IP) between a private client in a private address space created by a Network Address Translation (NAT)/firewall device and a remote client in an outside address space separate from the private address space, said method comprising:
    establishing a persistent registration connection between the private client and a traversal server in the outside address space, the persistent registration connection passing through the NAT/firewall device;
    registering with a standard communication registration server in the outside address space for multimedia information transfer with the private client;
    generating, at the traversal server, a probe definition that uniquely identifies a connection establishment event;
    sending a standard message according to a Session Initiation Protocol (SIP) for real-time multimedia communication from the traversal server to the private client, the standard message including the probe definition, the sending including
    receiving a standard SIP INVITE message at the traversal server from the private client via the persistent registration connection, the standard SIP INVITE message including at least one of a contact header and a record route header having an address of the private client,
    modifying at least one of the contact header or the record route header to include an address of the traversal server,
    forwarding the standard SIP INVITE message from the traversal server to a SIP registrar/proxy including at least one of a modified contact header and a modified record route header,
    receiving a standard SIP OK message at the traversal server from the remote client via the SIP registrar/proxy,
    adding a standard SDP parameter to the standard SIP OK message at the traversal server,
    adding the probe definition to the standard SIP OK message at the traversal server, the probe definition having been determined by the traversal server, and
    forwarding the standard SIP OK message including an added SDP parameter and an added probe definition to the private client;
    receiving a probe packet including a probe based on the probe definition at the traversal server from the private client, a source address of the probe packet having been translated by the NAT/firewall device; and
    transferring the multimedia information between the private client and the remote client through the NAT/firewall device over IP using the source address of the probe packet.

2. The method of claim 1, wherein the multimedia information includes a standard real-time protocol (RTP) based media information and the receiving a standard SIP INVITE message further comprises:
    receiving a standard SIP INVITE message that includes at least one media parameter set describing the RTP based media information.

3. The method of claim 1, wherein the receiving the probe packet further comprises:
    receiving the probe packet having a size less than 12 bytes.

4. The method of claim 1, wherein the transferring the multimedia information further comprises:
    receiving a standard SIP BYE message at the traversal server terminating the transferring the multimedia information; and
    releasing a resource at the traversal server associated with the transferring the multimedia information.

5. The method of claim 1, wherein the method further comprises:
    relaying SIP messages received at the private client from the traversal server to a further private client in the private address space; and
    relaying SIP messages received at the private client from the further private client to the traversal server.

6. The method of claim 1, wherein the establishing the persistent registration connection further comprises:
    establishing a standard Transport Layer Security (TLS) connection between the private client and the traversal server in the outside address space.

7. A method for transferring multimedia information over Internet protocol (IP) between a private client in a private address space created by a Network Address Translation (NAT)/firewall device and a remote client in an outside address space separate from the private address space, said method comprising:
    establishing a persistent registration connection between the private client and a traversal server in the outside address space, the persistent registration connection passing through the NAT/firewall device;
    registering with a standard communication registration server that includes a standard H.323 gatekeeper in the outside address space for multimedia information transfer with the private client, wherein said registering includes
    receiving a standard H.323 Registration Request message (RRQ) including a standard H.323 data parameter at the traversal server from the private client,
    modifying a timeToLive parameter in the standard RRQ message such that a subsequent RRQ message will be received from the private client prior to an expiration of a NAT binding for the persistent registration connection,
    removing the data parameter from the standard RRQ message,
    forwarding a modified standard RRQ message not having the data parameter to the gatekeeper,
    receiving a standard H.323 Registration Confirm (RCF) message at the traversal server from the gatekeeper,
    adding the data parameter to the RCF message, and
    forwarding the RCF message including the data parameter to the private client;
    sending a standard message according to a H.323 International Telecommunications Union (ITU) real-time multimedia communication from the traversal server to the private client, the standard message including a probe definition;
    receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

8. The method of claim 7, further comprising:
receiving a standard H.323 lightweight Registration Request message (Lightweight RRQ) at the traversal server from the private client using a same source address as a source address of the RRQ message received from the private client;
forwarding the Lightweight RRQ from the traversal server to the gatekeeper; and
forwarding a standard H.323 lightweight RCF message received at the traversal server from the gatekeeper to the private client.

9. The method of claim 7, wherein the receiving the probe packet further comprises:
receiving the probe packet having a size less than 12 bytes.

10. The method of claim 7, wherein the establishing the persistent registration connection further comprises:
establishing the persistent registration connection using standard User Datagram Protocol (UDP) messages between the private client and the traversal server in the outside address space.

11. The method of claim 7, wherein the standard H.323 data parameter includes a NonStandardData parameter.

12. The method of claim 7, further comprising:
storing a relationship between the source address of the probe packet and the probe; and
transferring the multimedia information between the private client and the remote client through the NAT/firewall device over IP based on the relationship between the source address of the probe packet and the probe.

13. A method for transferring multimedia information over Internet protocol (IP) between a private client in a private address space created by a Network Address Translation (NAT)/firewall device and a remote client in an outside address space separate from the private address space, said method comprising:
establishing a persistent registration connection between the private client and a traversal server in the outside address space, the persistent registration connection passing through the NAT/firewall device;
registering with a standard communication registration server in the outside address space for multimedia information transfer with the private client;
sending a standard message according to a H.323 International Telecommunications Union (ITU) real-time multimedia communication from the traversal server to the private client, the standard message including a probe definition, said sending includes
receiving a standard H.225 signaling message including a standard H.245 address at the traversal server from the standard communication registration server,
adding the probe definition to a H.323 standard data parameter in the standard H.225 signaling message,
modifying the H.245 address in the standard H.225 signaling message to form a modified H.245 address, and
forwarding the standard H.225 signaling message having the modified H.245 address and the probe definition to the private client, wherein an address in a transport-request construct of the data parameter is the same as the modified H.245 address;
receiving a probe packet including a probe based on the probe definition at the traversal server from the private client, a source address of the probe packet having been translated by the NAT/firewall device; and
transferring the multimedia information between the private client and the remote client through the NAT/firewall device over IP using the source address of the probe packet.

14. A method for transferring multimedia information over Internet protocol (IP) between a private client in a private address space created by a Network Address Translation (NAT)/firewall device and a remote client in an outside address space separate from the private address space, said method comprising:
establishing a persistent registration connection between the private client and a traversal server in the outside address space, the persistent registration connection passing through the NAT/firewall device;
registering with a standard communication registration server in the outside address space for multimedia information transfer with the private client;
sending a standard message according to a H.323 International Telecommunications Union (ITU) real-time multimedia communication from the traversal server to the private client, the standard message including a probe definition, said sending includes
receiving a H.225 standard Setup message at the traversal server from the standard communication registration server;
sending a standard Registration Admission Status (RAS) message to the private client from the traversal server via the persistent registration connection requesting that the private client establish a Transport Control Protocol (TCP) connection to the traversal server, the RAS message including a standard data parameter and a probe token,
establishing the TCP connection to the traversal server,
receiving the probe token at the traversal server from the private client via the TCP connection, and
forwarding the H.225 standard Setup message from the traversal server to the private client after receiving the probe token;
receiving a probe packet including a probe based on the probe definition at the traversal server from the private client, a source address of the probe packet having been translated by the NAT/firewall device; and
transferring the multimedia information between the private client and the remote client through the NAT/firewall device over IP using the source address of the probe packet.

15. A method for transferring multimedia information over Internet protocol (IP) between a private client in a private address space created by a Network Address Translation (NAT)/firewall device and a remote client in an outside address space separate from the private address space, said method comprising:
establishing a persistent registration connection between the private client and a traversal server in the outside address space, the persistent registration connection passing through the NAT/firewall device;
registering with a standard communication registration server in the outside address space for multimedia information transfer with the private client;
sending a standard message according to a H.323 International Telecommunications Union (ITU) real-time multimedia communication from the traversal server to the private client, the standard message including a probe definition, said sending includes receiving a H.245 standard message at the traversal server from the standard communication registration server using a TCP connection, sending a H.225 standard Facility message from the traversal server to the private client including a standard data parameter and an address on the traversal server to which the private client is to be connected and a probe token, establishing a TCP connection at the address on the traversal server from the H.225 standard Facility message, receiving the probe token at the traversal server from the private client via the TCP connection, and forwarding the H.245 standard message from the traversal server to the private client;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

16. A method for transferring multimedia information over Internet protocol (IP) between a private client in a private address space created by a Network Address Translation (NAT)/firewall device and a remote client in an outside address space separate from the private address space, said method comprising:

establishing a persistent registration connection between the private client and a traversal server in the outside address space, the persistent registration connection passing through the NAT/firewall device;

registering with a standard communication registration server that includes a gatekeeper in the outside address space for multimedia information transfer with the private client;

sending a standard message according to a H.323 International Telecommunications Union (ITU) real-time multimedia communication from the traversal server to the private client, the standard message including a probe definition, said sending includes receiving a standard H.245 OpenLogicalChannel message from the private client at the traversal server, adding an address of the traversal server to the OpenLogicalChannel message, forwarding the OpenLogicalChannel message including the address of the traversal server to the gatekeeper, receiving a standard H.245 OpenLogicalChannelAck message from the gatekeeper at the traversal server, adding a nonStandardData parameter to the OpenLogicalChannelAck message, the data parameter including a probe token and a traversal server address, and forwarding the OpenLogicalChannelAck message including the added-data nonStandardData parameter from the traversal server to the private client;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

17. The method of claim 16, wherein the multimedia information includes a real-time protocol (RTP) based media information and the adding the nonStandardData parameter further comprises:

recording the traversal server address;

modifying an address, in a H2250LogicalChannel parameter of the OpenLogicalChannelAck message, such that the multimedia information will be sent to the traversal server address; and adding probe token information to rtp and rtcp parameters of a Tx-Probe-Info construct in the OpenLogicalChannelAck message.

18. A method for transferring multimedia information over Internet protocol (IP) between a private client in a private address space created by a Network Address Translation (NAT)/firewall device and a remote client in an outside address space separate from the private address space, said method comprising:

establishing a persistent registration connection between the private client and a traversal server in the outside address space, the persistent registration connection passing through the NAT/firewall device;

registering with a standard communication registration server that includes a gatekeeper in the outside address space for multimedia information transfer with the private client;

sending a standard message according to a H.323 International Telecommunications Union (ITU) real-time multimedia communication from the traversal server to the private client, the standard message including a probe definition, said sending includes receiving a standard H.245 OpenLogicalChannel message from the gatekeeper at the traversal server, adding a data parameter to the OpenLogicalChannel message, the data parameter including a probe token and a traversal server address, and forwarding the OpenLogicalChannel message including the data parameter to the private client;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

19. The method of claim 18, wherein the multimedia information includes a real-time protocol (RTP) based media information and the adding the data parameter further comprises:

recording the traversal server address;

modifying an address, in a H2250LogicalChannel parameter of the OpenLogicalChannel message, such that the multimedia information will be sent to the traversal server address; and adding probe token information to rtp and rtcp parameters of a Tx-Probe-Info construct in the OpenLogicalChannel message.

20. A method for transferring multimedia information over Internet protocol (IP) between a private client in a private address space created by a Network Address Translation (NAT)/firewall device and a remote client in an outside address space separate from the private address space, said method comprising:

establishing a persistent registration connection between the private client and a traversal server in the outside address space, the persistent registration connection passing through the NAT/firewall device;

registering with a standard communication registration server that includes a gatekeeper in the outside address space for multimedia information transfer with the private client;

sending a standard message according to a H.323 International Telecommunications Union (ITU) real-time multimedia communication from the traversal server to the private client, the standard message including a probe definition, said sending includes receiving a standard H.225 Setup message at the traversal server from the private client, the H.225 Setup message including at least one set of transmit and receive addresses, modifying each set of transmit and receive addresses to be traversal server addresses, forwarding the standard H.225 Setup message including modified addresses to the gatekeeper, receiving a standard H.225 Alerting/Connect message at the traversal server from the gatekeeper, the H.225 Alerting/Connect message including a media destination address, recording the media destination address at the traversal server, modifying the media destination address in the H.225 Alerting/Connect message to be a traversal server address after recording the media destination address, and forwarding the H.225 Alerting/Connect message including a modified media destination address from the traversal server to the private client;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

21. A method for transferring multimedia information over Internet protocol (IP) between a private client in a private address space created by a Network Address Translation (NAT)/firewall device and a remote client in an outside address space separate from the private address space, said method comprising:

establishing a persistent registration connection between the private client and a traversal server in the outside address space, the persistent registration connection passing through the NAT/firewall device;

registering with a standard communication registration server that includes a gatekeeper in the outside address space for multimedia information transfer with the private client;

sending a standard message according to a H.323 International Telecommunications Union (ITU) real-time multimedia communication from the traversal server to the private client, the standard message including a probe definition, said sending includes receiving a standard H.225 Setup message at the traversal server from the gatekeeper, the standard H.225 Setup message including at least one set of transmit and receive addresses, adding a data parameter to the standard H.225 Setup message, the data parameter including a copy of an Rx-Probe-Info construct for each unique pair of offered transmit and receive addresses in the standard H.225 Setup message, forwarding the H.225 Setup message including the data parameter from the traversal server to the private client, receiving a standard H.225 Alerting/Connect message at the traversal server from the private client, the standard H.225 Alerting/Connect message including an answer to the offered transmit and receive addresses, modifying a transmit and receive address in the answer of the standard H.225 Alerting/Connect message to be a traversal server address, and forwarding the standard H.225 Alerting/Connect message from the traversal server to the gatekeeper;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

22. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the method comprising:

establishing a persistent registration connection between the private client and a traversal server in the outside address space, the persistent registration connection passing through the NAT/firewall device;

registering with a standard communication registration server in the outside address space for multimedia information transfer with the private client;

generating, at the traversal server, a probe definition that uniquely identifies a connection establishment event;

sending a standard message according to a Session Initiation Protocol (SIP) for real-time multimedia communication from the traversal server to the private client, the standard message including the probe definition, the sending including receiving a standard SIP INVITE message at the traversal server from the private client via the persistent registration connection, the standard SIP INVITE message including at least one of a contact header and a record route header having an address of the private client, modifying at least one of the contact header or the record route header to include an address of the traversal server, forwarding the standard SIP INVITE message from the traversal server to a SIP registrar/proxy including at least one of a modified contact header and a modified record route header, receiving a standard SIP OK message at the traversal server from the remote client via the SIP registrar/proxy, adding a standard SDP parameter to the standard SIP OK message at the traversal server, adding the probe definition to the standard SIP OK message at the traversal server, the probe definition having been determined by the traversal server, and forwarding the standard SIP OK message including a added SDP parameter and an added probe definition to the private client;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

23. The computer readable storage medium of claim 22, wherein the real-time communication standard includes Session Initiation Protocol (SIP), the multimedia information includes a standard real-time protocol (RTP) based media information and the receiving a standard SIP INVITE message further comprises:
receiving a standard SIP INVITE message that includes at least one media parameter set describing the RTP based media information.

24. The computer readable storage medium of claim 22, wherein the receiving the probe packet further comprises:
receiving the probe packet having a size less than 12 bytes.

25. The computer readable storage medium of claim 22, wherein the transferring the multimedia information further comprises:
receiving a standard SIP BYE message at the traversal server terminating the transferring the multimedia information; and
releasing a resource at the traversal server associated with the transferring the multimedia information.

26. The computer readable storage medium of claim 22, wherein the method further comprising:
relaying SIP messages received at the private client from the traversal server to a further private client in the private address space; and
relaying SIP messages received at the private client from the further private client to the traversal server.

27. The computer readable storage medium of claim 22, the establishing the persistent registration connection further comprises:
establishing a standard Transport Layer Security (TLS) connection between the private client and the traversal server in the outside address space.

28. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the method comprising:
establishing a persistent registration connection between the private client and a traversal server in the outside address space, the persistent registration connection passing through the NAT/firewall device;
registering with a standard communication registration server that includes a standard H.323 gatekeeper in the outside address space for multimedia information transfer with the private client, wherein said registering includes
receiving a standard H.323 Registration Request message (RRQ) including a standard H.323 data parameter at the traversal server from the private client,
modifying a timeToLive parameter in the standard RRQ message such that a subsequent RRQ message will be received from the private client prior to an expiration of a NAT binding for the persistent registration connection,
removing the data parameter from the standard RRQ message,
forwarding a modified standard RRQ message not having the data parameter to the gatekeeper,
receiving a standard H.323 Registration Confirm (RCF) message at the traversal server from the gatekeeper,
adding the data parameter to the RCF message, and
forwarding the RCF message including the data parameter to the private client,
sending a standard message according to a H.323 International Telecommunications Union (ITU) real-time multimedia communication from the traversal server to the private client, the standard message including a probe definition;
receiving a probe packet including a probe based on the probe definition at the traversal server from the private client, a source address of the probe packet having been translated by the NAT/firewall device; and
transferring the multimedia information between the private client and the remote client through the NAT/firewall device over IP using the source address of the probe packet.

29. The computer readable storage medium of claim 28, further comprising:
receiving a standard H.323 lightweight Registration Request message (Lightweight RRQ) at the traversal server from the private client using a same source address as a source address of the RRQ message received from the private client;
forwarding the Lightweight RRQ from the traversal server to the gatekeeper; and
forwarding a standard H.323 lightweight RCF message received at the traversal server from the gatekeeper to the private client.

30. The computer readable storage medium of claim 28, wherein the receiving the probe packet further comprises:
receiving the probe packet having a size less than 12 bytes.

31. The computer readable storage medium of claim 28, wherein the establishing the persistent registration connection further comprises:
establishing the persistent registration connection using standard User Datagram Protocol (UDP) messages between the private client and the traversal server in the outside address space.

32. The computer readable storage medium of claim 28, wherein the standard H.323 data parameter includes a NonStandardData parameter.

33. The computer readable storage medium of claim 28, further comprising:
storing a relationship between the source address of the probe packet and the probe; and
transferring the multimedia information between the private client and the remote client through the NAT/firewall device over IP based on the relationship between the source address of the probe packet and the probe.

34. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the method comprising:
establishing a persistent registration connection between the private client and a traversal server in the outside address space, the persistent registration connection passing through the NAT/firewall device;
registering with a standard communication registration server in the outside address space for multimedia information transfer with the private client;
sending a standard message according to a H.323 International Telecommunications Union (ITU) real-time multimedia communication from the traversal server to the private client, the standard message including a probe definition, said sending includes receiving a standard H.225 signaling message including a standard H.245 address at the traversal server from the standard communication registration server, adding the probe definition to a H.323 standard data parameter in the standard H.225 signaling message, modifying the H.245 address in the standard H.225 signaling message to form a modified H.245 address, and forwarding the standard 1-1.225 signaling message having the modified 1-1.245 address and the probe definition to the private client, wherein an address in a transport-request construct of the data parameter is the same as the modified H.245 address;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

35. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the method comprising:

establishing a persistent registration connection between the private client and a traversal server in the outside address space, the persistent registration connection passing through the NAT/firewall device;

registering with a standard communication registration server in the outside address space for multimedia information transfer with the private client;

sending a standard message according to a H.323 International Telecommunications Union (ITU) real-time multimedia communication from the traversal server to the private client, the standard message including a probe definition, said sending includes receiving a H.225 standard Setup message at the traversal server from the standard communication registration server, sending a standard Registration Admission Status (RAS) message to the private client from the traversal server via the persistent registration connection requesting that the private client establish a Transport Control Protocol (TCP) connection to the traversal server, the RAS message including a standard data parameter and a probe token, establishing the TCP connection to the traversal server, receiving the probe token at the traversal server from the private client via the TCP connection, and forwarding the H.225 standard Setup message from the traversal server to the private client after receiving the probe token;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

36. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the method comprising:

establishing a persistent registration connection between the private client and a traversal server in the outside address space, the persistent registration connection passing through the NAT/firewall device;

registering with a standard communication registration server in the outside address space for multimedia information transfer with the private client;

sending a standard message according to a H.323 International Telecommunications Union (ITU) real-time multimedia communication from the traversal server to the private client, the standard message including a probe definition, said sending includes receiving a H.245 standard message at the traversal server from the standard communication registration server using a TCP connection, sending a H.225 standard Facility message from the traversal server to the private client including a standard data parameter and an address on the traversal server to which the private client is to be connected and a probe token, establishing a TCP connection at the address on the traversal server from the H.225 standard Facility message, receiving the probe token at the traversal server from the private client via the TCP connection, and forwarding the H.245 standard message from the traversal server to the private client;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

37. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the method comprising:

establishing a persistent registration connection between the private client and a traversal server in the outside address space, the persistent registration connection passing through the NAT/firewall device;

registering with a standard communication registration server in the outside address space for multimedia information transfer with the private client;

sending a standard message according to a H.323 International Telecommunications Union (ITU) real-time multimedia communication from the traversal server to the private client, the standard message including a probe definition, said sending includes receiving a standard H.245 OpenLogicalChannel message from the private client at the traversal server, adding an address of the traversal server to the OpenLogicalChannel message;

forwarding the OpenLogicalChannel message including the address of the traversal server to the standard message communication registration server, receiving a standard H.245 OpenLogicalChannelAck message from the standard message communication registration server at the traversal server, adding a nonStandardData parameter to the OpenLogicalChannelAck message, the data parameter including a probe token and a traversal server address, and forwarding the OpenLogicalChannelAck message including the nonStandardData parameter from the traversal server to the private client;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

38. The computer readable storage medium of claim 37, wherein the multimedia information includes a real-time protocol (RTP) based media information and the adding the nonStandardData parameter further comprises:

recording the traversal server address;

modifying an address, in a H2250LogicalChannel parameter of the OpenLogicalChannelAck message, such that the multimedia information will be sent to the traversal server address; and adding probe token information to rtp and rtcp parameters of a Tx-Probe-Info construct in the OpenLogicalChannelAck message.

39. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the steps comprising:

establishing a persistent registration connection between the private client and a traversal server in the outside address space, the persistent registration connection passing through the NAT/firewall device;

registering with a standard communication registration server that includes a gatekeeper in the outside address space for multimedia information transfer with the private client;

sending a standard message according to a H.323 International Telecommunications Union (ITU) real-time multimedia communication from the traversal server to the private client, the standard message including a probe definition, said sending includes receiving a standard H.245 OpenLogicalChannel message from the gatekeeper at the traversal server, adding a data parameter to the OpenLogicalChannel message, the data parameter including a probe token and a traversal server address, and forwarding the OpenLogicalChannel message including the data parameter to the private client, receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

40. The computer readable storage medium of claim 39, wherein the multimedia information includes a real-time protocol (RTP) based media information and the adding the data parameter further comprises:

recording the traversal server address;

modifying an address, in a H2250LogicalChannel parameter of the OpenLogicalChannel message, such that the multimedia information will be sent to the traversal server address; and adding probe token information to rtp and rtcp parameters of a Tx-Probe-Info construct in the OpenLogicalChannel message.

41. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the method comprising:

establishing a persistent registration connection between the private client and a traversal server in the outside address space, the persistent registration connection passing through the NAT/firewall device;

registering with a standard communication registration server in the outside address space for multimedia information transfer with the private client;

sending a standard message according to a H.323 International Telecommunications Union (ITU) real-time multimedia communication from the traversal server to the private client, the standard message including a probe definition, said sending includes receiving a standard H.225 Setup message at the traversal server from the private client, the H.225 Setup message including at least one set of transmit and receive addresses, modifying each set of transmit and receive addresses to be traversal server addresses, forwarding the standard H.225 Setup message including modified addresses to the standard communication registration server, receiving a standard H.225 Alerting/Connect message at the traversal server from the standard communication registration server, the H.225 Alerting/Connect message including a media destination address, recording the media destination address at the traversal server, modifying the media destination address in the H.225 Alerting/Connect message to be a traversal server address after recording the media destination address, and forwarding the H.225 Alerting/Connect message including a modified media destination address from the traversal server to the private client;

receiving a probe packet including a probe based on the probe definition at the traversal server from the private client, a source address of the probe packet having been translated by the NAT/firewall device; and transferring the multimedia information between the private client and the remote client through the NAT/firewall device over IP using the source address of the probe packet.

42. A computer readable storage medium storing computer program instructions which when executed by a computer cause the computer to implement a method for transferring multimedia information over Internet protocol (IP) between a private client in a private address space created by a Network Address Translation (NAT)/firewall device and a remote client in an outside address space separate from the private address space, the method comprising:
 establishing a persistent registration connection between the private client and a traversal server in the outside address space, the persistent registration connection passing through the NAT/firewall device;
 registering with a standard communication registration server that includes a gatekeeper in the outside address space for multimedia information transfer with the private client;
 sending a standard message according to a H.323 International Telecommunications Union (ITU) real-time multimedia communication from the traversal server to the private client, the standard message including a probe definition, said sending includes
 receiving a standard H.225 Setup message at the traversal server from the standard communication registration server, the standard H.225 Setup message including at least one set of transmit and receive addresses,
 adding a data parameter to the standard H.225 Setup message, the data parameter including a copy of an Rx-Probe-Info construct for each unique pair of offered transmit and receive addresses in the standard H.225 Setup message,
 forwarding the H.225 Setup message including the data parameter from the traversal server to the private client,
 receiving a standard H.225 Alerting/Connect message at the traversal server from the private client, the standard H.225 Alerting/Connect message including an answer to the offered transmit and receive addresses,
 modifying a transmit and receive address in the answer of the standard H.225 Alerting/Connect message to be a traversal server address, and
 forwarding the standard H.225 Alerting/Connect message from the traversal server to the gatekeeper;
 receiving a probe packet including a probe based on the probe definition at the traversal server from the private client, a source address of the probe packet having been translated by the NAT/firewall device; and
 transferring the multimedia information between the private client and the remote client through the NAT/firewall device over IP using the source address of the probe packet.

43. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:
 a client registration unit configured to establish a persistent registration connection with the private client, the persistent registration connection passing through the NAT/firewall device;
 a server registration unit configured to register with a standard communication registration server in the outside address space for multimedia information transfer with the private client;
 a generating unit configured to generate a probe definition that uniquely identifies a connection establishment event;
 a standard message sending unit configured to send a standard message according to a communication standard for real-time multimedia communication to the private client, the standard message including the probe definition, the standard message sending unit including
 a receiving unit configured to receive a standard SIP INVITE message from the private client via the persistent registration connection, the standard SIP INVITE message including at least one of a contact header and a record route header having an address of the private client,
 a processor configured to modify at least one of the contact header or the record route header to include the traversal server address,
 a forwarding unit configured to forward the standard SIP INVITE message to a SIP registrar/proxy including at least one of a modified contact header or a modified record route header,
 the receiving unit further configured to receive a standard SIP OK message from the remote client via the SIP registrar/proxy,
 an adding unit configured to add a standard SDP parameter including the probe definition to the standard SIP OK message and to add the probe definition to the standard SIP OK message, the probe definition having been determined by the traversal server, and
 the forwarding unit further configured to forward the standard SIP OK message including an added SDP parameter and a added probe definition to the private client; and
 a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

44. The traversal server of claim 43, wherein the real-time communication standard includes Session Initiation Protocol (SIP), the multimedia information includes a standard real-time protocol (RTP) based media information and the receiving unit is further configured to receive a standard SIP INVITE message that includes at least one media parameter set describing the RTP based media information.

45. The traversal server of claim 43, wherein the probe packet receiving unit is further configured to receive the probe packet having a size less than 12 bytes.

46. The traversal server of claim 43, wherein the probe packet receiving unit is further configured to receive a standard SIP BYE message terminating a transfer of the multimedia information.

47. The traversal server of claim 43, wherein the client registration unit further comprises:
 a TLS unit configured to establish a standard Transport Layer Security (TLS) connection to the private client.

48. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:
 a client registration unit configured to establish a persistent registration connection with the private client, the persistent registration connection passing through the NAT/firewall device;

a server registration unit configured to register with a standard communication registration server including a standard H.323 gatekeeper in the outside address space for multimedia information transfer with the private client, the server registration unit including a receiving unit configured to receive a standard H.323 Registration Request message (RRQ) including a standard H.323 data parameter from the private client, a processor configured to modify a timeToLive parameter in the standard RRQ message such that a subsequent RRQ message will be received from the private client prior to an expiration of a NAT binding for the persistent registration connection, a removing unit configured to remove the data parameter from the standard RRQ message, a forwarding unit configured to forward a modified standard RRQ message not having the data parameter to the gatekeeper, the receiving unit further configured to receive a standard H.323 Registration Confirm (RCF) message from the gatekeeper, an adding unit configured to add the data parameter to the RCF message, and the forwarding unit further configured to forward the RCF message including the data parameter to the private client;

a standard message sending unit configured to send a standard message according to a H.323 International Telecommunications Union (ITU) real-time multimedia communication from the traversal server to the private client, the standard message including a probe definition; and a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

49. The traversal server of claim 48, wherein the receiving unit is further configured to receive a standard H.323 lightweight Registration Request message (Lightweight RRQ) from the private client using a same source address as a source address of the RRQ message received from the private client, and the forwarding unit is further configured to forward the Lightweight RRQ to the gatekeeper and to forward a standard H.323 lightweight RCF message received from the gatekeeper to the private client.

50. The traversal server of claim 48, wherein the probe packet receiving unit is further configured to receive the probe packet having a size less than 12 bytes.

51. The traversal server of claim 48, wherein the client registration unit is further configured to establish the persistent registration connection using standard User Datagram Protocol (UDP) messages to the private client.

52. The traversal server of claim 48, wherein the standard H.323 data parameter includes a NonStandardData parameter.

53. The traversal server of claim 48, further comprising:
a storing unit configured to store a relationship between the source address of the probe packet and the probe; and
a transferring unit configured to transfer the multimedia information between the private client and the remote client through the NAT/firewall device over IP based on the relationship between the source address of the probe packet and the probe.

54. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:

a client registration unit configured to establish a persistent registration connection with the private client, the persistent registration connection passing through the NAT/firewall device;

a server registration unit configured to register with a standard communication registration server in the outside address space for multimedia information transfer with the private client;

a standard message sending unit configured to send a standard message according to a H.323 International Telecommunications Union (ITU) real-time multimedia communication from the traversal server to the private client, the standard message including a probe definition, the standard message sending unit including a receiving unit configured to receive a standard H.225 signaling message including a standard H.245 address from the standard communication registration server;

an adding unit configured to add the probe definition to a H.323 standard data parameter in the standard H.225 signaling message, a processor configured to modify the H.245 address in the standard H.225 signaling message to form a modified H.245 address, and a forwarding unit configured to forward the standard H.225 signaling message having the modified H.245 address and the probe definition to the private client, wherein an address in a transport-request construct of the data parameter is the same as the modified H.245 address; and a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

55. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:

a client registration unit configured to establish a persistent registration connection with the private client, the persistent registration connection passing through the NAT/firewall device;

a server registration unit, including a processor, configured to register with a standard communication registration server in the outside address space for multimedia information transfer with the private client;

a standard message sending unit configured to send a standard message according to a H.323 International Telecommunications Union (ITU) real-time multimedia communication from the traversal server to the private client, the standard message including a probe definition, the standard message sending unit including a receiving unit configured to receive a H.225 standard Setup message from the standard communication registration server, a sending unit configured to send a standard Registration Admission Status (RAS) message to the private client via the persistent registration connection requesting that the private client establish a Transport Control Protocol (TCP) connection to the traversal server, the RAS message including a standard data parameter and a probe token, a TCP unit configure to establish the TCP connection to the private client, the receiving unit further configured to receive the probe token from the private client via the TCP connection, and a forwarding unit configured to forward the H.225 standard Setup message to the private client after receiving the probe token; and a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

56. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:

a client registration unit configured to establish a persistent registration connection with the private client, the persistent registration connection passing through the NAT/firewall device;

a server registration unit, including a processor, configured to register with a standard communication registration server that includes a gatekeeper in the outside address space for multimedia information transfer with the private client;

a standard message sending unit configured to send a standard message according to a H.323 International Telecommunications Union (ITU) real-time multimedia communication from the traversal server to the private client, the standard message including a probe definition, the standard message sending unit including a receiving unit configured to receive a H.245 standard message from the gatekeeper using a TCP connection, a sending unit configured to send a H.225 standard Facility message to the private client including a standard data parameter and the traversal server address and a probe token, a TCP unit configured to establish a TCP connection at the traversal server address from the H.225 standard Facility message, the receiving unit further configured to receive the probe token from the private client via the TCP connection, and a forwarding unit configure to forward the H.245 standard message to the private client; and a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

57. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:

a client registration unit configured to establish a persistent registration connection with the private client, the persistent registration connection passing through the NAT/firewall device;

a server registration unit, including a processor, configured to register with a standard communication registration server in the outside address space for multimedia information transfer with the private client;

a standard message sending unit configured to send a standard message according to a H.323 International Telecommunications Union (ITU) real-time multimedia communication from the traversal server to the private client, the standard message including a probe definition, the standard message sending unit including a receiving unit configured to receive a standard H.245 OpenLogicalChannel message from the private client, an adding unit configured to add an the traversal server address to the OpenLogicalChannel message, a forwarding unit configured to forward the OpenLogicalChannel message including the traversal server address to the standard communication registration server, the receiving unit further configured to receive a standard H.245 OpenLogicalChannelAck message from the standard communication registration server, the adding unit further configured to add a nonStandardData parameter to the OpenLogicalChannelAck message, the data parameter including a probe token and the traversal server address, and the forwarding unit further configured to forward the OpenLogicalChannelAck message including the nonStandardData parameter from to the private client; and a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

58. The traversal server of claim 57, wherein the multimedia information includes a real-time protocol (RTP) based media information and the adding unit further comprises:

a recording unit configured to record the traversal server address;

a modifying unit configured to modify an address, in a H2250LogicalChannel parameter of the OpenLogicalChannelAck message, such that the multimedia information will be sent to the traversal server address; and a probe token adding unit configured to add probe token information to rtp and rtcp parameters of a Tx-ProbeInfo construct in the OpenLogicalChannelAck message.

59. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:

a client registration unit configured to establish a persistent registration connection with the private client, the persistent registration connection passing through the NAT/firewall device;

a server registration unit, including a processor, configured to register with a standard communication registration server in the outside address space for multimedia information transfer with the private client;

a standard message sending unit configured to send a standard message according to a H.323 International Telecommunications Union (ITU) real-time multimedia communication from the traversal server to the private client, the standard message including a probe definition, the standard message sending unit including a receiving unit configured to receive a standard H.245 OpenLogicalChannel message from the standard communication registration server, an adding unit configured to add a data parameter to the OpenLogicalChannel message, the data parameter including a probe token and the traversal server address, and a forwarding unit configured to forward the OpenLogicalChannel message including the data parameter to the private client; and a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

60. The traversal server of claim 59, wherein the multimedia information includes a real-time protocol (RTP) based media information and the adding unit further comprises:

a recording unit configured to record the traversal server address;

a modifying unit configured to modify an address, in a H2250LogicalChannel parameter of the OpenLogicalChannel message, such that the multimedia information will be sent to the traversal server address; and a probe token adding unit configured to add probe token information to rtp and rtcp parameters of a Tx-Probe-Info construct in the OpenLogicalChannel message.

61. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:

a client registration unit configured to establish a persistent registration connection with the private client, the persistent registration connection passing through the NAT/firewall device;

a server registration unit configured to register with a standard communication registration server in the outside address space for multimedia information transfer with the private client;

a standard message sending unit configured to send a standard message according to a H.323 International Telecommunications Union (ITU) real-time multimedia communication from the traversal server to the private client, the standard message including a probe definition, the standard message sending unit including a receiving unit configured to receive a standard H.225 Setup message from the private client, the H.225 Setup message including at least one set of transmit and receive addresses, a processor configured to modify each set of transmit and receive addresses to the traversal server addresses, a forwarding unit configured to forward the standard H.225 Setup message including modified addresses to the standard communication registration server, a receiving unit configured to receive a standard H.225 Alerting/Connect message from the standard communication registration server, the H.225 Alerting/Connect message including a media destination address, a recording unit configured to record the media destination address, the processor further configured to modify the media destination address in the H.225 Alerting/Connect message to be a traversal server address in the traversal server addresses after recording the media destination address, and the forwarding unit further configured to forward the H.225 Alerting/Connect message including a modified media destination address to the private client; and a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

62. A traversal server in an outside address space configured to transfer multimedia information over Internet protocol (IP) between a private client in a private address space separate from the outside address space and a remote client in the outside address space, the private address space being created by a Network Address Translation (NAT)/firewall device, the traversal server comprising:

a client registration unit configured to establish a persistent registration connection with the private client, the persistent registration connection passing through the NAT/firewall device;

a server registration unit configured to register with a standard communication registration server in the outside address space for multimedia information transfer with the private client;

a standard message sending unit configured to send a standard message according to a H.323 International Telecommunications Union (ITU) real-time multimedia communication from the traversal server to the private client, the standard message including a probe definition, the standard message sending unit including a receiving unit configured to receive a standard H.225 Setup message from the gatekeeper, the standard H.225 Setup message including at least one set of transmit and receive addresses, an adding unit configured to add a data parameter to the standard H.225 Setup message, the data parameter including a copy of an Rx-Probe-Info construct for each unique pair of offered transmit and receive addresses in the standard H.225 Setup message, a forwarding unit configured to forward the H.225 Setup message including the data parameter from to the private client, the receiving unit further configured to receive a standard H.225 Alerting/Connect message from the private client, the standard H.225 Alerting/Connect message including an answer to the offered transmit and receive addresses, a processor configured to modify a transmit and receive address in the answer of the standard H.225 Alerting/Connect message to be the traversal server address, and the forwarding unit further configured to forward the standard H.225 Alerting/Connect message to the standard communication registration server; and a probe packet receiving unit configured to receive a probe packet including a probe based on the probe definition from the private client, a source address of the probe packet having been translated by the NAT/firewall device, wherein the multimedia information is transferred between the private client and the remote client through the NAT/firewall device over IP using the source address of the probe packet.

63. A private client for multimedia transfer in a private address space created by a Network Address Translation (NAT)/firewall device, said private client comprising:

a persistent registration unit configured to establish a persistent registration connection to a traversal server in an outside address space separate from the private address space, the persistent registration connection passing through the NAT/firewall device;

a server registration unit, including a processor, configured to register with a standard communication registration server that includes a standard H.323 gatekeeper in the outside address space for multimedia information transfer, the server registration unit including a sending unit configured to send a standard H.323 Registration Request message (RRQ) including a standard H.323 data parameter to the traversal server, and a receiving unit configured to receive a standard H.323 Registration Confirm (RCF) message from the gatekeeper via the traversal server, the RCF message including the standard H.323 data parameter;

a standard message receiving unit configured to receive a standard message according to a H.323 International Telecommunications Union (ITU) real-time multimedia communication from the traversal server, the standard message including a probe definition;

a probe packet sending unit configured to send a probe packet including a probe based on the probe definition to the traversal server; and a multimedia transferring unit configured to transfer the multimedia information to a remote client in the outside address space through the NAT/firewall device over IP using a source address of the probe packet.

64. The private client of claim 63, the server registration unit further comprising:

a sending unit configured to send a standard H.323 lightweight Registration Request message (Lightweight RRQ) to the traversal server using a same source address as a source address of the RRQ message sent to the traversal server.

65. The private client of claim 63, wherein the probe packet sending unit is further configured to send the probe packet having a size less than 12 bytes.

66. The private client of claim 63, wherein the persistent registration unit is further configured to establish the persistent registration connection using standard User Datagram Protocol (UDP) messages to the traversal server in the outside address space.

67. The private client of claim 63, wherein the standard H.323 data parameter includes a NonStandardData parameter.

68. The private client of claim 63, further comprising:

a storing unit configured to store a relationship between the source address of the probe packet and the probe, wherein the multimedia transferring unit is further configured to transfer the multimedia information to the remote client through the NAT/firewall device over IP based on the relationship between the source address of the probe packet and the probe.

69. A private client for multimedia transfer in a private address space created by a Network Address Translation (NAT)/firewall device, said private client comprising:

a persistent registration unit configured to establish a persistent registration connection to a traversal server in an outside address space separate from the private address space, the persistent registration connection passing through the NAT/firewall device;

a server registration unit, including a processor, configured to register with a standard communication registration server in the outside address space for multimedia information transfer;

a standard message receiving unit configured to receive a standard message according to a H.323 International Telecommunications Union (ITU) real-time multimedia communication from the traversal server, the standard message including a probe definition, said standard message receiving unit including a receiving unit configured to receive a standard H.225 signaling message including a standard H.245 address, and the probe definition in a H.323 standard data parameter, wherein an address in a transport-request construct of the data parameter is the same as the H.245 address;

a probe packet sending unit configured to send a probe packet including a probe based on the probe definition to the traversal server; and a multimedia transferring unit configured to transfer the multimedia information to a remote client in the outside address space through the NAT/firewall device over IP using a source address of the probe packet.

70. A private client for multimedia transfer in a private address space created by a Network Address Translation (NAT)/firewall device, said private client comprising:

a persistent registration unit, including a processor, configured to establish a persistent registration connection to a traversal server in an outside address space separate from the private address space, the persistent registration connection passing through the NAT/firewall device;

a server registration unit configured to register with a standard communication registration server in the outside address space for multimedia information transfer;

a standard message receiving unit configured to receive a standard message according to a H.323 International Telecommunications Union (ITU) real-time multimedia communication from the traversal server, the standard message including a probe definition, said standard message receiving unit including a receiving unit configured to receive a standard Registration Admission Status (RAS) message from the traversal server via the persistent registration connection requesting establishment of a Transport Control Protocol (TCP) connection to the traversal server, the RAS message including a standard data parameter and a probe token, a TCP connection unit configured to establish the TCP connection to the traversal server, a probe token sending unit configured to send the probe token to the traversal server via the TCP connection, and the receiving unit further configured to receive a H.225 standard Setup message from the traversal server after sending the probe token;

a probe packet sending unit configured to send a probe packet including a probe based on the probe definition to the traversal server; and a multimedia transferring unit configured to transfer the multimedia information to a remote client in the outside address space through the NAT/firewall device over IP using a source address of the probe packet.

71. A private client for multimedia transfer in a private address space created by a Network Address Translation (NAT)/firewall device, said private client comprising:

a persistent registration unit configured to establish a persistent registration connection to a traversal server in an outside address space separate from the private address space, the persistent registration connection passing through the NAT/firewall device;

a server registration unit, including a processor, configured to register with a standard communication registration server in the outside address space for multimedia information transfer;

a standard message receiving unit configured to receive a standard message according to a H.323 International Telecommunications Union (ITU) real-time multimedia communication from the traversal server, the standard message including a probe definition, said standard message receiving unit including a receiving unit configured to receive a H.225 standard Facility message from the traversal server including a standard data parameter and an address on the traversal server to which the traversal server is to be connected and a probe token, a TCP connection unit configured to establish a TCP connection to the traversal server at the address on the traversal server from the H.225 standard Facility message, a sending unit configured to send the probe token to the traversal server via the TCP connection, and the receiving unit further configured to receive a H.245 standard message from the traversal server;

a probe packet sending unit configured to send a probe packet including a probe based on the probe definition to the traversal server; and a multimedia transferring unit configured to transfer the multimedia information to a remote client in the outside address space through the NAT/firewall device over IP using a source address of the probe packet.

72. A private client for multimedia transfer in a private address space created by a Network Address Translation (NAT)/firewall device, said private client comprising:

a persistent registration unit configured to establish a persistent registration connection to a traversal server in an outside address space separate from the private address space, the persistent registration connection passing through the NAT/firewall device;

a server registration unit, including a processor, configured to register with a standard communication registration server in the outside address space for multimedia information transfer;

a standard message receiving unit configured to receive a standard message according to a H.323 International Telecommunications Union (ITU) real-time multimedia communication from the traversal server, the standard message including a probe definition, said standard message receiving unit including a sending unit configured to send a standard H.245 OpenLogicalChannel message to the traversal server, and a receiving unit configured to receive an OpenLogicalChannelAck message including a nonStandardData parameter including a probe token and a traversal server address from the traversal server;

a probe packet sending unit configured to send a probe packet including a probe based on the probe definition to the traversal server; and a multimedia transferring unit configured to transfer the multimedia information to a remote client in the outside address space through the NAT/firewall device over IP using a source address of the probe packet.

73. The private client of claim 72, wherein the multimedia information includes a real-time protocol (RTP) based media information and the standard message receiving unit further comprises a recording unit configured to record the traversal server address.

74. A private client for multimedia transfer in a private address space created by a Network Address Translation (NAT)/firewall device, said private client comprising:

a persistent registration unit configured to establish a persistent registration connection to a traversal server in an outside address space separate from the private address space, the persistent registration connection passing through the NAT/firewall device;

a server registration unit, including a processor, configured to register with a standard communication registration server in the outside address space for multimedia information transfer;

a standard message receiving unit configured to receive a standard message according to a H.323 International Telecommunications Union (ITU) real-time multimedia communication from the traversal server, the standard message including a probe definition, said standard message receiving unit including a receiving unit configured to receive a standard H.245 OpenLogicalChannel message from the traversal server, the OpenLogicalChannel message including a data parameter having a probe token and a traversal server address;

a probe packet sending unit configured to send a probe packet including a probe based on the probe definition to the traversal server; and a multimedia transferring unit configured to transfer the multimedia information to a remote client in the outside address space through the NAT/firewall device over IP using a source address of the probe packet.

75. The private client of claim 74, wherein the multimedia information includes a real-time protocol (RTP) based media information and the receiving unit is further configured to record the traversal server address and receive probe token information in rtp and rtcp parameters of a Tx-Probe-Info construct in the OpenLogicalChannel message.

76. A private client for multimedia transfer in a private address space created by a Network Address Translation (NAT)/firewall device, said private client comprising:

a persistent registration unit configured to establish a persistent registration connection to a traversal server in an outside address space separate from the private address space, the persistent registration connection passing through the NAT/firewall device;

a server registration unit, including a processor, configured to register with a standard communication registration server in the outside address space for multimedia information transfer;

a standard message receiving unit configured to receive a standard message according to a H.323 International Telecommunications Union (ITU) real-time multimedia communication from the traversal server, the standard message including a probe definition, said standard message receiving unit including a sending section configured to send a standard H.225 Setup message to the traversal server, the H.225 Setup message including at least one set of transmit and receive addresses, receiving a standard H.225 Alerting/Connect message from the traversal server, the H.225 Alerting/Connect message including a media destination address that is a traversal server address;

a probe packet sending unit configured to send a probe packet including a probe based on the probe definition to the traversal server; and a multimedia transferring unit configured to transfer the multimedia information to a remote client in the outside address space through the NAT/firewall device over IP using a source address of the probe packet.

77. A private client for multimedia transfer in a private address space created by a Network Address Translation (NAT)/firewall device, said private client comprising:

a persistent registration unit configured to establish a persistent registration connection to a traversal server in an outside address space separate from the private address space, the persistent registration connection passing through the NAT/firewall device;

a server registration unit, including a processor, configured to register with a standard communication registration server in the outside address space for multimedia information transfer;

a standard message receiving unit configured to receive a standard message according to a H.323 International Telecommunications Union (ITU) real-time multimedia communication from the traversal server, the standard message including a probe definition, said standard message receiving unit including a receiving unit configured to receive a standard H.225 Setup message from the traversal server, the standard H.225 Setup message including at least one set of transmit and receive addresses and a data parameter, the data parameter including a copy of an Rx-Probe-Info construct for each unique pair of offered transmit and receive addresses in the standard H.225 Setup message, and a sending unit configured to send a standard H.225 Alerting/Connect message to the traversal server, the standard H.225 Alerting/Connect message including an answer to the offered transmit and receive addresses;

a probe packet sending unit configured to send a probe packet including a probe based on the probe definition to the traversal server; and a multimedia transferring unit configured to transfer the multimedia information to a remote client in the outside address space through the NAT/firewall device over IP using a source address of the probe packet.

* * * * *